(12) United States Patent
Morita

(10) Patent No.: US 8,503,735 B2
(45) Date of Patent: Aug. 6, 2013

(54) IMAGE PROCESSING TO PERFORM GROUPING BASED ON DEPTH-OF-RELATIONSHIP VALUES

(75) Inventor: Yugo Morita, Kanagawa (JP)

(73) Assignee: Sony Corporation (JP)

( * ) Notice: Subject to any disclaimer, the term of this patent is extended or adjusted under 35 U.S.C. 154(b) by 791 days.

(21) Appl. No.: 12/590,441

(22) Filed: Nov. 6, 2009

(65) Prior Publication Data

US 2010/0142762 A1 Jun. 10, 2010

(30) Foreign Application Priority Data

Dec. 9, 2008 (JP) ................................ P2008-312971

(51) Int. Cl.
*G06K 9/00* (2006.01)

(52) U.S. Cl.
USPC .......................................................... 382/115

(58) Field of Classification Search
None
See application file for complete search history.

(56) References Cited

U.S. PATENT DOCUMENTS

| 2008/0112621 A1* | 5/2008 | Gallagher et al. ............ 382/190 |
| 2008/0123907 A1 | 5/2008 | Eura et al. |
| 2008/0253663 A1 | 10/2008 | Gotoh et al. |

FOREIGN PATENT DOCUMENTS

| JP | 2001255455 A | 9/2001 |
| JP | 2002259730 A | 9/2002 |
| JP | 2002333652 A | 11/2002 |
| JP | 2004-133637 A | 4/2004 |
| JP | 2006079457 A | 3/2006 |
| JP | 2006079460 A | 3/2006 |
| JP | 2006081021 A | 3/2006 |
| JP | 2006155095 A | 6/2006 |
| JP | 2006165822 A | 6/2006 |
| JP | 2006236216 A | 9/2006 |
| JP | 2007041964 A | 2/2007 |
| JP | 2008071112 A * | 3/2008 |
| JP | 2008-129830 A | 6/2008 |
| JP | 2008-250605 A | 10/2008 |

OTHER PUBLICATIONS

Office Action from Japanese Application No. 2008-312971, dated Aug. 31, 2010.
Office Action from Japanese Application No. 2008-312971, dated Mar. 22, 2011.

* cited by examiner

*Primary Examiner* — Nirav G Patel
(74) *Attorney, Agent, or Firm* — Lerner, David, Littenberg, Krumholz & Mentlik, LLP

(57) ABSTRACT

An image processing apparatus includes: a depth-of-relationship value calculation unit that regards a person, who appears in any of a plurality of contents, as a specific person, and calculates a depth-of-relationship value, which indicates the degree of depth of the relationship between the specific person and a second person, on the basis of an appearance frequency of the second person or a third person other than the second person in contents in which the specific person appears, and the appearance frequencies of the second person and the third person in contents in which the specific person does not appear; and a priority determination unit that determines a priority, which is assigned to the second person relating to the specific person among the persons appearing in the plurality of contents, on the basis of the calculated depth-of-relationship value.

9 Claims, 28 Drawing Sheets

FIG.2
| DISCRIMINATION NUMBER | REGISTERED NAME | FEATURE QUANTITY | REGISTERED FACE IMAGE |
|---|---|---|---|
| #1 | A | ... |  |
| #2 | B | ... |  |
| #3 | C | ... |  |
| #4 | D | ... |  |
| #5 | E | ... |  |
| #6 | F | ... |  |
| #7 | G | ... |  |
| #8 | H | ... |  |
| #9 | I | ... |  |

FIG.4

| PERSON\IMAGE | A | B | C | D | E | F | G | H | I |
|---|---|---|---|---|---|---|---|---|---|
| P301 | ○ | – | – | – | ○ | – | ○ | – | – |
| P302 | – | – | ○ | ○ | – | – | – | – | – |
| P303 | – | ○ | ○ | – | – | – | – | – | – |
| P304 | ○ | – | – | – | – | ○ | – | – | – |
| P305 | – | – | – | – | – | – | – | – | ○ |
| P306 | ○ | – | – | – | – | – | ○ | – | – |
| P307 | ○ | – | – | – | – | – | – | ○ | – |
| P308 | ○ | – | – | – | ○ | – | – | – | – |
| P309 | ○ | – | – | – | ○ | – | – | – | – |
| P310 | ○ | – | – | ○ | – | ○ | – | – | – |
| P311 | – | ○ | – | – | ○ | – | – | – | – |
| P312 | ○ | – | ○ | – | – | – | – | – | – |
| P313 | ○ | – | – | – | ○ | – | ○ | – | – |
| P314 | ○ | – | – | – | ○ | – | – | – | – |
| P315 | – | – | – | – | ○ | – | ○ | – | – |
| P316 | – | ○ | – | – | ○ | – | – | – | – |
| P317 | ○ | – | ○ | – | – | – | – | – | – |
| P318 | – | – | ○ | ○ | – | – | – | – | – |

200

330

| | A | B | C | D | E | F | G | H | I |
|---|---|---|---|---|---|---|---|---|---|
| A | | 0 | 2 | 1 | 5 | 2 | 3 | 1 | 0 |
| B | – | | 1 | 0 | 2 | 0 | 0 | 0 | 0 |
| C | – | – | | 2 | 0 | 0 | 0 | 0 | 0 |
| D | – | – | – | | 0 | 1 | 0 | 0 | 0 |
| E | – | – | – | – | | 0 | 3 | 0 | 0 |
| F | – | – | – | – | – | | 0 | 0 | 0 |
| G | – | – | – | – | – | – | | 0 | 0 |
| H | – | – | – | – | – | – | – | | 0 |
| I | – | – | – | – | – | – | – | – | |

| PERSON | ZERO-ORDER DEPTH-OF-RELATIONSHIP VALUE | FIRST-ORDER DEPTH-OF-RELATIONSHIP VALUE |
|---|---|---|
| B | 0 | 12 ($=2 \times 1 + 5 \times 2$) |
| C | 2 | 2 ($=1 \times 2$) |
| D | 1 | 6 ($=2 \times 2 + 2 \times 1$) |
| E | 5 | 9 ($=3 \times 3$) |
| F | 2 | 1 ($=1 \times 1$) |
| G | 3 | 15 ($=5 \times 3$) |
| H | 1 | 0 |
| I | 0 | 0 |

351 = PERSON column, 352 = ZERO-ORDER, 353 = FIRST-ORDER

| PRIORITY | 1 | 2 | 3 | 4 | 5 | 6 | 7 | 8 |
|---|---|---|---|---|---|---|---|---|
| PERSON | E | G | C | F | D | H | B | I |
| ZERO-ORDER DEPTH-OF-RELATIONSHIP VALUE | 5 | 3 | 2 | 2 | 1 | 1 | 0 | 0 |
| FIRST-ORDER DEPTH-OF-RELATIONSHIP VALUE | 9 | 15 | 2 | 1 | 6 | 0 | 12 | 0 |

361 = PRIORITY, 362 = PERSON, 363 = ZERO-ORDER, 364 = FIRST-ORDER

| PERSON / IMAGE | A | B | C | D |
|---|---|---|---|---|
| P601 | (X11,Y11) | (X12,Y12) | — | (X13,Y13) |
|  | (H11,W11) | (H12,W12) | — | (H13,W13) |
| P602 | (X21,Y21) | — | (X22,Y22) | — |
|  | (H21,W21) | — | (H22,W22) | — |
| P603 | (X31,Y31) | (X32,Y32) | (X33,Y33) | (X34,Y34) |
|  | (H31,W31) | (H32,W32) | (H33,W33) | (H34,W34) |

610

|   | A | B | C | D |
|---|---|---|---|---|
| A |   | 2 | 2 | 2 |
| B | — |   | 1 | 2 |
| C | — | — |   | 1 |
| D | — | — | — |   |

*FIG.15A*

| PERSON / IMAGE | P601 | P602 | P603 | ZERO-ORDER DEPTH-OF-RELATIONSHIP VALUE | FIRST-ORDER DEPTH-OF-RELATIONSHIP VALUE |
|---|---|---|---|---|---|
| A | | | | | |
| B | 1 | 0 | 1 | 2 (33%) | 6 (2×1 + 2×2) |
| C | 0 | 1 | 1 | 2 (33%) | 4 (2×1 + 2×1) |
| D | 1 | 0 | 1 | 2 (33%) | 6 (2×2 + 2×1) |
| SUM | 2 | 1 | 3 | 6 (100%) | |

*FIG.15B*

| PRIORITY | 1 | 2 | 3 |
|---|---|---|---|
| PERSON | B | D | C |
| ZERO-ORDER DEPTH-OF-RELATIONSHIP VALUE | 2 | 2 | 2 |
| FIRST-ORDER DEPTH-OF-RELATIONSHIP VALUE | 6 | 6 | 4 |

650

|   | A | B | C | D |
|---|---|---|---|---|
| A |   | $\frac{5}{6}\left(\frac{1}{2}+\frac{1}{3}\right)$ | $\frac{4}{3}\left(\frac{1}{1}+\frac{1}{3}\right)$ | $\frac{5}{6}\left(\frac{1}{2}+\frac{1}{3}\right)$ |
| B | — |   | $\frac{1}{3}$ | $\frac{5}{6}\left(\frac{1}{2}+\frac{1}{3}\right)$ |
| C | — | — |   | $\frac{1}{3}$ |
| D | — | — | — |   |

FIG. 17A

| IMAGE / PERSON | P601 | P602 | P603 | ZERO-ORDER DEPTH-OF-RELATIONSHIP VALUE | FIRST-ORDER DEPTH-OF-RELATIONSHIP VALUE |
|---|---|---|---|---|---|
| A | | | | | |
| B | $\frac{1}{2}$ | 0 | $\frac{1}{3}$ | $\frac{5}{6}$ (28%) | $\frac{41}{36}\left(\frac{4}{3}\times\frac{1}{3}+\frac{5}{6}\times\frac{5}{6}\right)$ |
| C | 0 | 1 | $\frac{1}{3}$ | $\frac{8}{6}$ (44%) | $\frac{10}{18}\left(\frac{5}{6}\times\frac{1}{3}+\frac{5}{6}\times\frac{1}{3}\right)$ |
| D | $\frac{1}{2}$ | 0 | $\frac{1}{3}$ | $\frac{5}{6}$ (28%) | $\frac{41}{36}\left(\frac{5}{6}\times\frac{5}{6}+\frac{4}{3}\times\frac{1}{3}\right)$ |
| SUM | 1 | 1 | 1 | 3 (100%) | |

| PRIORITY | 1 | 2 | 3 |
|---|---|---|---|
| PERSON | C | B | D |
| ZERO-ORDER DEPTH-OF-RELATIONSHIP VALUE | $\frac{8}{6}$ | $\frac{5}{6}$ | $\frac{5}{6}$ |
| FIRST-ORDER DEPTH-OF-RELATIONSHIP VALUE | $\frac{10}{18}$ | $\frac{41}{36}$ | $\frac{41}{36}$ |

| OBJECTS PERSONS / REFERENCE PERSONS | A | B | C | D |
|---|---|---|---|---|
| A |  | $\frac{5}{6}\left(\frac{1}{3}+\frac{1}{2}\right)$ | $\frac{7}{6}\left(\frac{1}{1}+\frac{1}{6}\right)$ | $1\left(\frac{2}{3}+\frac{1}{3}\right)$ |
| B | $\frac{7}{6}\left(\frac{2}{3}+\frac{1}{2}\right)$ |  | $\frac{1}{3}$ | $\frac{1}{2}\left(\frac{1}{3}+\frac{1}{6}\right)$ |
| C | $\frac{4}{3}\left(\frac{1}{1}+\frac{1}{3}\right)$ | $\frac{1}{2}$ |  | $\frac{1}{6}$ |
| D | $\frac{7}{6}\left(\frac{2}{3}+\frac{1}{2}\right)$ | $\frac{2}{3}\left(\frac{1}{3}+\frac{1}{3}\right)$ | $\frac{1}{6}$ |  |

| PERSON \ IMAGE | P601 | P602 | P603 | ZERO-ORDER DEPTH-OF-RELATIONSHIP VALUE | FIRST-ORDER DEPTH-OF-RELATIONSHIP VALUE |
|---|---|---|---|---|---|
| A | | | | | |
| B | $\frac{1}{3}$ | 0 | $\frac{1}{2}$ | $\frac{5}{6}$ (28%) | $\frac{11}{12}\left(\frac{7}{6}\times\frac{1}{2}+1\times\frac{2}{3}\right)$ |
| C | 0 | 1 | $\frac{1}{6}$ | $\frac{7}{6}$ (39%) | $\frac{4}{9}\left(\frac{5}{6}\times\frac{1}{3}+1\times\frac{2}{3}\right)$ |
| D | $\frac{2}{3}$ | 0 | $\frac{1}{3}$ | 1 (33%) | $\frac{11}{18}\left(\frac{5}{6}\times\frac{1}{2}+\frac{7}{6}\times\frac{1}{6}\right)$ |
| SUM | 1 | 1 | 1 | 3 (100%) | |

FIG.21B

| PRIORITY | 1 | 2 | 3 |
|---|---|---|---|
| PERSON | C | D | B |
| ZERO-ORDER DEPTH-OF-RELATIONSHIP VALUE | $\frac{7}{6}$ | $\frac{6}{6}$ | $\frac{5}{6}$ |
| FIRST-ORDER DEPTH-OF-RELATIONSHIP VALUE | $\frac{4}{9}$ | $\frac{11}{18}$ | $\frac{11}{12}$ |

IMAGE PROCESSING TO PERFORM GROUPING BASED ON DEPTH-OF-RELATIONSHIP VALUES

CROSS-REFERENCE TO RELATED APPLICATION

The present application claims priority from Japanese Patent Application No. JP 2008-312971 filed in the Japanese Patent Office on Dec. 9, 2008, the entire content of which is incorporated herein by reference.

BACKGROUND OF THE INVENTION

1. Field of the Invention

The present invention relates to an image processing apparatus. More particularly, the present invention is concerned with an image processing apparatus and an imaging device that perform image analysis on contents such as images, a processing method to be implemented in the image processing apparatus and imaging device, and a program causing a computer to implement the method.

2. Description of the Related Art

In recent years, imaging devices that image subjects such as persons so as to record contents such as images or motion pictures, and that include a digital still camera and a digital video camera have prevailed. Numerous retrieving technologies for sorting the thus recorded contents and numerous displaying technologies for assisting in browsing have been proposed.

For example, a contents management apparatus that uses pieces of positional information on positions, at which contents are recorded, to classify the multiple contents into multiple groups, and displays the contents on the basis of the results of classification has been proposed. For example, a proposal has been made of a contents management apparatus that produces binary-tree structure data, which has contents associated with leaves of a binary tree, on the basis of the pieces of positional information on the contents, and extracts nodes, which meet a condition for grouping, from among nodes specified in the binary-tree structure data. Contents associated with each of the extracted nodes are determined as one group, and contents are classified into the determined groups (refer to, for example, FIG. 3 in JP-A-2008-250605 (patent document 1).

SUMMARY OF THE INVENTION

According to the foregoing related art, since pieces of positional information on contents are used to classify the contents, any content can be displayed based on user's likes. However, the user's likes are so diversified that contents may be requested to be utilized by reflecting the user's likes irrespective of the positions at which the contents are recorded.

For example, in recent years, a proposal has been made of an image processing apparatus capable of detecting human faces appearing in contents, and discriminating the detected faces from a specific person's face. If the contents can be displayed using the results of the discrimination of individual faces, display can presumably be achieved based on user's likes. For example, when the results of the discrimination of individual faces are used to display contents, in which a user-designated specific person appears, according to priority, the contents in which persons meeting the user's likes appear can be displayed according to priority.

However, for example, there is a possibility that even in contents in which a user-designated specific person does not appear, persons having deep relationships to the specific person may appear. If the persons having deep relationships to the specific person appear, the human relationships of the specific person can be learned by looking at the persons. Thus, browsing the contents is thought to be made more enjoyable.

The present invention addresses the foregoing situation. There is a need for ready utilization of contents meeting user's likes.

According to an embodiment of the present invention, there are provided: an image processing apparatus including a depth-of-relationship value calculation unit that regards a person, who appears in any of a plurality of contents, as a specific person, and calculates a depth-of-relationship value, which indicates the degree of depth of the relationship between the specific person and a second person on the basis of an appearance frequency of the second person or a third person other than the second person in contents in which the specific person appears, and the appearance frequencies of the second person and the third person in contents in which the specific person does not appear, and a priority determination unit that determines a priority, which is assigned to the second person relating to the specific person among the persons appearing in the plurality of contents, on the basis of the calculated depth-of-relationship value; a processing method implemented in the image processing apparatus; and a program causing a computer to implement the method. The depth-of-relationship value concerning the pair of the specific person and the second person is calculated based on the appearance frequency of the second person or the third person in the contents in which the specific person appears, and the appearance frequencies of the second person and third person in the contents in which the specific person does not appear. Based on the calculated depth-of-relationship value, the priority of the second person relating to the specific person is determined.

According to the embodiment of the present invention, the depth-of-relationship value calculation unit may calculate scores to be given to pairs of persons, which appear in the plurality of contents, on the basis of the appearance frequencies of the pairs of persons, which appear together in the same contents, among the persons appearing in the plurality of contents. Based on the score given to the pair of the specific person and the second person, the score given to the pair of the specific person and third person, and the score given to the pair of the second person and third person, the depth-of-relationship value may be calculated. Based on the appearance frequencies of the pairs of persons, who appear together in the same contents, among the persons appearing in the plurality of contents, the scores to be given to the pairs of persons appearing in the plurality of contents are calculated. Based on the score given to the pair of the specific person and the second person, the score given to the specific person and the third person, and the score given to the second person and the third person, the depth-of-relationship value is calculated.

According to the embodiment of the present invention, the depth-of-relationship value calculation unit may calculate a first depth-of-relationship value on the basis of the score given to the pair of the specific person and the second person, and may calculate a second depth-of-relationship value on the basis of the score given to the pair of the third person and the specific person and the score given to the pair of the second person and the third person. The priority determination unit may determine the priority on the basis of the calculated first depth-of-relationship value and second depth-of-relationship value. Namely, the first depth-of-relationship value is calculated based on the score given to the pair of the specific person and the second person, and the second depth-of-relationship value is calculated based on the score given to the pair of the third person and the specific person and the score given to the pair of the second person and the third person. The priority is determined based on the first depth-of-relationship value and the second depth-of-relationship value.

According to the embodiment of the present invention, the priority determination unit may calculate the depth-of-relationship value on the basis of a value obtained by weighting the calculated first depth-of-relationship value and second depth-of-relationship values. Namely, the depth-of-relationship value is calculated based on the values obtained by weighting the calculated first depth-of-relationship value and second depth-of-relationship value.

According to the embodiment of the present invention, the image processing apparatus may further include an output control unit that controls output of the plurality of contents according to the determined priorities. Namely, output of the plurality of contents is controlled according to the determined priorities.

According to the embodiment of the present invention, the depth-of-relationship value calculation unit may calculate the scores to be given to the pairs of persons, who appear in the plurality of contents, on the basis of the appearance frequencies of pairs of persons, who appear in the same contents, among the persons appearing in the plurality of contents, and the number of the persons appearing together in the same contents, and may calculate the depth-of-relationship value on the basis of the score given to the pair of the specific person and the second person, the score given to the pair of the specific person and third person, and the score given to the pair of the second person and the third person. Namely, the scores given to the pairs of the persons appearing in the plurality of contents are calculated based on the appearance frequencies of the pairs of the persons, who appear together in the same content, among the persons appearing in the plurality of contents, and the number of the persons appearing together in the same contents. The depth-of-relationship value is calculated based on the score given to the pair of the specific person and the second person, the score given to the pair of the specific person and the third person, the score given to the pair of the second person and the third person.

According to the embodiment of the present invention, the depth-of-relationship value calculation unit may calculate the scores to be given to the pairs of persons, who appear in the plurality of contents, on the basis of the appearance frequencies of the pairs of the persons, who appear together in the same contents, among the persons appearing in the plurality of contents, and distances between the pairs of the persons appearing together in the same contents, and may calculate the depth-of-relationship value on the basis of the score given to the pair of the specific person and the second person, the score given to the pair of the specific person and third person, and the score given to the pair of the second person and the third person. Namely, the scores to be given to the persons appearing in the plurality of contents are calculated based on the appearance frequencies of the pairs of the persons, who appear together in the same contents, among the persons appearing in the plurality of contents, and the distances between the pairs of the persons appearing together in the same contents. The depth-of-relationship value is calculated based on the score given to the pair of the specific person and the second person, the score given to the pair of the specific person and the third person, and the score given to the pair of the second person and the third person.

According to the embodiment of the present invention, the content refers to a plurality of frames occupying a predetermined interval out of intervals constituting a motion picture. The depth-of-relationship value calculation unit may calculate scores to be given to pairs of persons, who appear in the motion picture, on the basis of the appearance frequencies of the pairs of the persons, which appear within the same intervals, among persons appearing in the motion picture, and the periods during which the pairs of persons appear together in the same frames within the same intervals, and may calculate the depth-of-relationship value on the basis of the score given to the pair of the specific person and the second person, the score given to the pair of the specific person and the third person, and the score given to the pair of the second person and the third person. Namely, the scores given to the pairs of the persons appearing in the motion picture are calculated based on the appearance frequencies of the pairs of the persons, which appear within the same intervals, among the persons appearing in the motion picture, and the periods during which the pairs of the persons appear together in the same frames within the same intervals. The depth-of-relationship value is calculated based on the score given to the pair of the specific person and the second person, the score given to the pair of the specific person and the third person, and the score given to the pair of the second person and the third person.

According to another embodiment of the present invention, there are provided: an image processing apparatus including an discrimination information memory unit in which pieces of discrimination information for use in discriminating faces of persons from one another are stored, a manipulation recognition unit that recognizes a designating manipulation performed to designate one of persons, which have pieces of discrimination information thereon stored, as a specific person, a contents input unit that inputs a plurality of contents, a face detection unit that detects faces appearing in the inputted contents, a face discrimination unit that discriminates the faces, which are detected based on the pieces of discrimination information, from one another, a depth-of-relationship value calculation unit that specifies persons, who appear in the plurality of contents, on the basis of the results of discrimination, and calculates a depth-of-relationship value, which indicates the degree of depth of the relationship between the specific person and a second person, on the basis of an appearance frequency of the second person or a third person other than the second person in contents in which the specific person appears, and the appearance frequencies of the second person and the third person in contents in which the specific person does not appear, a priority determination unit that determines a priority, which is assigned to the second person relating to the specific person among the persons appearing in the plurality of contents, on the basis of the calculated depth-of-relationship value, and an output control unit that controls output of the inputted contents according to the determined priority; a processing method implemented in the image processing apparatus; and a program causing a computer to implement the method. Namely, faces appearing in the inputted contents are detected, and the detected faces are discriminated from one another. Persons appearing in the plurality of contents are identified based on the results of the discrimination. The depth-of-relationship value concerning the pair of the specific person and the second person is calculated based on the appearance frequency of the second person or the third person in contents in which the specific person appears, and the appearance frequencies of the second person and the third person in contents in which the specific person does not appear. The depth-of-relationship value concerning the pair of the second person and the specific person is calculated based on the relationship between pair of the persons in the contents in which the specific person appears, and the relationship between pair of the persons in the contents in which the specific person does not appear. The priority of the second person relating to the specific person is determined based on the calculated depth-of-relationship value. Output of the plurality of contents is controlled according to the determined priority.

According to still another embodiment of the present invention, there are provided: an imaging device including an imaging unit that images subjects and produces images, a depth-of-relationship value calculation unit that regards two persons, which appears in any of the produced images, as a specific person and a second person, and calculates a depth-of-relationship values, which indicates the degree of depth of the relationship between the specific person and a second person, on the basis of an appearance frequency of the second person or a third person other than the second person in images in which the specific person appears, and the appearance frequencies of the second person and the third person in images in which the specific person does not appear, a priority determination unit that determines a priority, which is assigned to the second person relating to the specific person among the persons appearing in the produced images, on the basis of the calculated depth-of-relationship value, and an imaging control unit that designates imaging parameter, which is employed in production of the images by the imaging unit, according to the determined priority; a processing method implemented in the imaging device; and a program causing a computer to implement the method. Namely, the depth-of-relationship value concerning the pair of the specific person and the second person is calculated based on the appearance frequency of the second person or the third person in the images in which the specific person appears, and the appearance frequencies of the second person and the third person in the images in which the specific person does not appear. The priority of the second person relating to the specific person is determined based on the calculated depth-of-relationship value. The imaging parameter is designated based on the determined priority.

According to the embodiments of the present invention, an excellent advantage of making it possible to readily utilize contents meeting user's likes is provided.

BRIEF DESCRIPTION OF THE DRAWINGS

FIG. 2 is a diagram illustratively showing pieces of information stored in a registered-person information memory unit employed in the first embodiment of the present invention;

FIG. 4 is a diagram schematically showing contents stored in a results-of-face discrimination memory unit employed in the first embodiment of the present invention;

FIGS. 6A and 6B are diagrams showing an example of depth-of-relationship values obtained based on the contents of the results-of-face discrimination memory unit employed in the first embodiment of the present invention, and an example of priorities determined based on the depth-of-relationship values;

FIG. 13 is a diagram schematically showing the contents of a face information memory unit employed in the second embodiment of the present invention;

FIGS. 15A and 15B are diagrams showing an example of depth-of-relationship values obtained based on the contents of the face information memory unit employed in the second embodiment of the present invention, and an example of priorities determined based on the depth-of-relationship values;

FIGS. 17A and 17B are diagrams showing an example of depth-of-relationship values obtained based on the contents of the face information memory unit employed in the second embodiment of the present invention, and an example of priorities determined based on the depth-of-relationship values;

FIG. 19 is a diagram showing a human relationship table created based on the contents of the face information memory unit employed in the second embodiment of the present invention;

FIGS. 21A and 21B are diagrams showing an example of depth-of-relationship values obtained based on the contents of the face information memory unit employed in the second embodiment of the present invention, and the distances between pairs of persons calculated by an inter-face distance calculation unit, and an example of priorities determined based on the depth-of-relationship values;

DESCRIPTION OF THE PREFERRED EMBODIMENTS

The best modes in which the present invention is implemented (hereinafter, referred to as embodiments) will be described below. A description will be made in the following sequence.

1. First embodiment (priority determination control: an example in which depth-of-relationship values concerning a specific person are calculated and priorities are determined based on the depth-of-relationship values)

2. Second embodiment (priority determination control: an example in which depth-of-relationship values are calculated in consideration of inter-face distances or the numbers of persons appearing in images)

3. Third embodiment (priority determination control: an example in which depth-of-relationship values are calculated in consideration of periods during which pairs of persons appear together in a motion picture)

4. Fourth embodiment (imaging control based on priorities: an example in which imaging parameters are determined using priorities)

<1. First Embodiment>
[Example of the Configuration of an Image Processing Apparatus]

Figure 1:
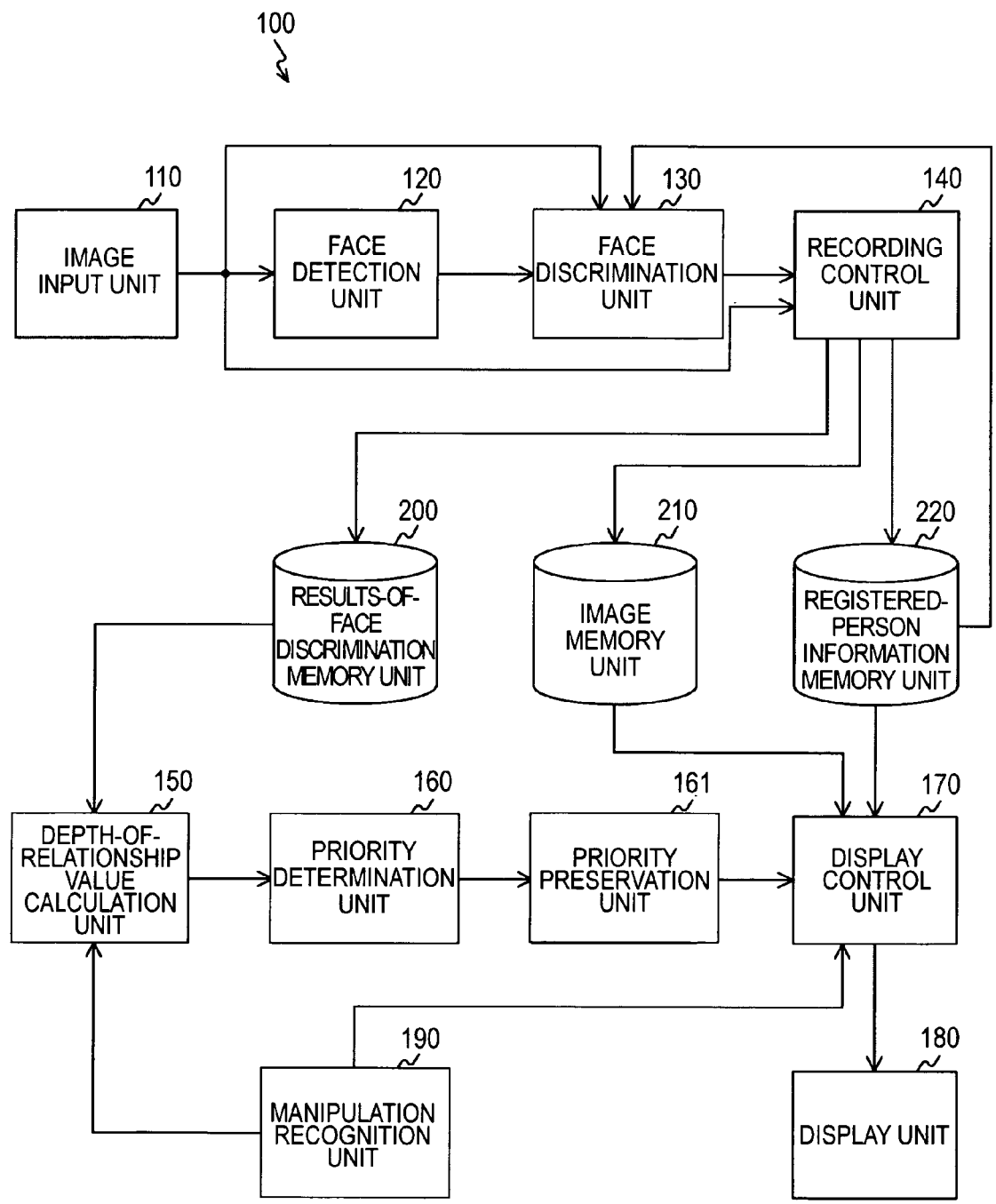
FIG. 1 is a block diagram showing an example of the functional configuration of an image processing apparatus in accordance with a first embodiment of the present invention.

FIG. 1 is a block diagram showing an example of the functional configuration of an image processing apparatus 100 in accordance with the first embodiment of the present invention. The image processing apparatus 100 includes an image input unit 110, a face detection unit 120, a face discrimination unit 130, a recording control unit 140, a depth-of-relationship value calculation unit 150, a priority determination unit 160, and a priority preservation unit 161. The image processing apparatus 100 further includes a display control unit 170, a display unit 180, a manipulation recognition unit 190, a results-of-face discrimination memory unit 200, an image memory unit 210, and a registered-person information memory unit 220. The image processing apparatus 100 is realized with, for example, a personal computer capable of extracting feature quantities from images, which are recorded by an imaging device such as a digital still camera, by performing image analyzing processing, and performing various kinds of pieces of image processing using the extracted feature quantities.

The image input unit 110 inputs images (image data items) recorded by the imaging device such as a digital still camera, and outputs the inputted images to each of the face detection unit 120, face discrimination unit 130, and recording control unit 140. The image input unit 110 is an example of a contents input unit set forth in Claims.

The face detection unit 120 detects faces of persons appearing in images outputted from the image input unit 110, and outputs pieces of face-detection information on the detected faces to the face discrimination unit 130. If multiple faces are detected in one image, pieces of face-detection information on the detected faces are outputted to the face discrimination unit 130. As a face detecting method, for example, a face detecting method based on matching of a template, in which pieces of information on facial luminance distributions are recorded, with a real image (refer to, for example, JP-A-2004-133637) or a face detecting method utilizing a flesh-color part of an image or a feature quantity of a human face may be adopted. Face-detection information includes a position of a detected face in an image and the size thereof. The position of a detected face in an image shall be, for example, a center position in a face region (for example, a rectangular area) in the image in which the face appears, and the size of the detected face in the image shall, for example, refer to the lengths in the horizontal and perpendicular directions of the face region in the image.

The face discrimination unit 130 uses feature quantities 223 (see FIG. 2) stored in the registered-person information memory unit 220 to decide whether the faces detected by the face detection unit 120 correspond to the faces of registered persons. The results of face discrimination are outputted to the recording control unit 140 while being associated with the images that are objects of discrimination and the pieces of face-detection information. More particularly, the face discrimination unit 130 extracts rectangular face images, in which the faces detected by the face detection unit 120 appear, from the images outputted from the image input unit 110 on the basis of the pieces of face-detection information outputted from the face detection unit 120. Feature quantities are extracted from the fetched face images, and compared with the feature quantities 223 stored in the registered-person information memory unit 220 in order to decide whether the faces detected by the face detection unit 120 correspond to the faces of registered persons.

The feature quantity is discrimination information to be used to decide whether a face detected in an image refers to a face of a registered person, for example, data representing the feature or property of a face image and being used to recognize the positional relationship among the components of a face, that is, the eyes, nose, mouth, and eyebrows, or the shapes of the components. The feature quantity is extracted based on, for example, a value of a color or luminance. As the results of face discrimination, pieces of face-discrimination information on registered persons identified with the discriminated faces of the registered persons (for example, discrimination numbers 221 shown in FIG. 2) are outputted to the recording control unit 140.

As the face discriminating method, for example, a discriminating method of comparing a feature quantity, which is extracted from a face image to be compared, with a feature quantity relevant to a face of a registered person so as to calculate the similarity between the feature quantities, and, if the calculated similarity exceeds a threshold, recognizing a face represented by the face image as the face of the registered person may be adopted. Otherwise, a discriminating method of, for example, performing discriminating processing using a feature vector as the feature quantity may be adopted (refer to, for example, JP-A-2008-129830).

If the feature quantity of a face detected by the face detection unit 120 is not found among the feature quantities stored in the registered-person information memory unit 220, the face discrimination unit 130 fails to discriminate the face from others. When the face detected by the face detection unit 120 is not discriminated from others, the feature quantity characterizing the face is stored as a feature quantity relevant to a newly registered person in the registered-person information memory unit 220. Specifically, when the face discrimination unit 130 fails to discriminate a detected face from others, the face discrimination unit 130 outputs the feature quantity characterizing the face to the recording control unit 140. The recording control unit 140 stores the feature quantity as the feature quantity relevant to a newly registered person in the registered-person information memory unit 220. In this case, the face discrimination unit 130 outputs a face image representing the face to the recording control unit 140, and the recording control unit 140 stores the face image as a registered face image of the newly registered person in the registered-person information memory unit 220 in association with the feature quantity.

The recording control unit 140 controls recordings of data items in of the results-of-face discrimination memory unit 200, image memory unit 210, and registered-person information memory unit 220. More particularly, the recording control unit 140 records images outputted from the image input unit 110 in the image memory unit 210, and records the results of face discrimination, which are outputted from the face discrimination unit 130, in the results-of-face discrimination memory unit 200 in association with the images. If a detected face is not discriminated from others, the recording control unit 140 records a feature quantity characterizing the face and a face image as a feature quantity relevant to a newly registered person and a registered face image in the registered-person information memory unit 220.

In the results-of-face discrimination memory unit 200, the results of face discrimination outputted from the face discrimination unit 130 are stored in association with images that are objects of discrimination under the control of the recording control unit 140. The stored results of face discrimination are fed to the depth-of-relationship value calculation unit 150. The results-of-face discrimination memory unit 200 will be detailed later with reference to FIG. 4.

In the image memory unit 210, images outputted from the image input unit 110 are stored under the control of the recording control unit 140. The stored images are fed to the display control unit 170.

In the registered-person information memory unit 220, pieces of information on registered persons (pieces of registered-person information) are stored under the control of the recording control unit 140. The stored pieces of registered-person information are fed to the face discrimination unit 130 or display control unit 170. Herein, the registered person is a person registered in the image processing apparatus 100, and the registered-person information is information on the person registered in the image processing apparatus 100. In the present embodiment of the invention, persons having pieces of registered-person information thereon recorded in the registered-person information memory unit 220 are regarded as registered persons. Among the registered persons, a registered person designated by a user shall be called a specific person. The registered-person information memory unit 220 will be detailed later with reference to FIG. 2. The registered-person information memory unit 220 is an example of a discrimination information memory unit set forth in Claims.

The depth-of-relationship value calculation unit 150 calculates depth-of-relationship values, which indicate the degrees of depth of the relationships between the specific person and other persons appearing in the images stored in the image memory unit 210 based on the results of face discrimination stored in the results-of-face discrimination memory unit 200. The calculated depth-of-relationship values are outputted to the priority determination unit 160. More particularly, when the manipulation recognition unit 190 recognizes a designating manipulation performed in order to designate one of the persons who have pieces of registered-person information thereon stored in the registered-person information memory unit 220, the depth-of-relationship value calculation unit 150 calculates the depth-of-relationship values concerning the designated person (specific person). In this case, the depth-of-relationship value calculation unit 150 calculates the depth-of-relationship values on the basis of the relationships between pairs of persons appearing in images in which the specific person appears, and the relationships between pairs of persons appearing in images in which the specific person does not appear. For example, the depth-of-relationship values concerning the pairs of the specific person and the second person are calculated based on the appearance frequencies of the second person or the third person in the images in which the specific person appears, and the appearance frequencies of the second person and the third person in the images in which the specific person does not appear. Specifically, the depth-of-relationship value calculation unit 150 counts the appearance frequencies of pairs of persons, who appear together in the same images, among the persons appearing in the images stored in the image memory unit 210, and calculates scores, which are given to the pairs of persons, on the basis of the results of counting. Based on the scores given to the pairs of the specific person and the second person, zero-order depth-of-relationship values relative to the second person are calculated. Based on the scores given to the pairs of the specific person and third person and the scores given to the pairs of the second person and the third person, first-order depth-of-relationship values relative to the second person are calculated. The calculation of the depth-of-relationship values will be detailed later with reference to FIG. 5A to FIG. 6B.

The priority determination unit 160 determines priorities to be assigned to multiple persons, who have pieces of registered-person information thereon stored in the registered-person information memory unit 220, on the basis of the depth-of-relationship values outputted from the depth-of-relationship value calculation unit 150. The determined priorities are outputted to and preserved in the priority preservation unit 161. The determination of priorities will be detailed later with reference to FIG. 5A to FIG. 6B.

The priority preservation unit 161 preserves the priorities outputted from the priority determination unit 160, and feeds the preserved priorities to the display control unit 170.

The display control unit 170 displays each of the images, which are stored in the image memory unit 210 and registered-person information memory unit 220, on the display unit 180 according to the contents of a manipulation recognized by the manipulation recognition unit 190. For example, when a designating manipulation performed in order to display faces of registered persons all together has been recognized by the manipulation recognition unit 190, the display control unit 170 acquires the registered face images (see FIG. 2) stored in the registered-person information memory unit 220. The acquired registered face images are displayed all together on the display unit 180. For example, when a designating manipulation performed to designate one registered face image among the registered face images displayed all together on the display unit 180 has been recognized by the manipulation recognition unit 190, the display control unit 170 acquires the priorities preserved in the priority preservation unit 161. The display control unit 170 then acquires the multiple images stored in the image memory unit 210, and sequentially displays the images on the display unit 180 according to the priorities acquired from the priority preservation unit 161. Examples of display will be detailed later with reference to FIG. 7 to FIG. 8B. The display control unit 170 is an example of an output control unit set forth in Claims.

The display unit 180 displays images under the control of the display control unit 170. The display unit 180 is realized with, for example, a liquid crystal display (LCD).

The manipulation recognition unit 190 is a manipulation recognition unit that recognizes the contents of a manipulation performed by a user, and outputs a signal, which depends on the contents of the recognized manipulation, to the depth-of-relationship value calculation unit 150 or display control unit 170. Incidentally, at least a part of the manipulation recognition unit 190 and the display unit 180 may be united as a touch panel.

FIG. 2 is a diagram illustratively showing pieces of information stored in the registered-person information memory unit 220 employed in the first embodiment of the present invention. In the registered-person information memory unit 220, discrimination numbers 221, registered names 222, feature quantities 223, and registered face images 224 are stored in association with one another. FIG. 2 shows a case where pieces of registered-person information on nine persons of a person A to a person I are stored in the registered-person information memory unit 220.

The discrimination number 221 is discrimination information to be used to discriminate persons, who have pieces of registered-person information thereon stored in the registered-person information memory unit 220, from one another. For example, #1, #2, etc. are assigned to the pieces of registered-person information in the order in which the pieces of registered-person information are stored, and then stored.

The registered name 222 is a name assigned to each of the persons having pieces of registered-person information thereon stored in the registered-person information memory unit 220. For example, when a name of a registered person having a feature quantity and a face image thereon stored in the registered-person information memory unit 220 is entered by a user, the entered name is stored as the registered name 222. In FIG. 2, alphabets A to I are substituted for names.

The feature quantity 223 is a feature quantity relevant to each of the persons having pieces of registered-person information thereon stored in the registered-person information memory unit 220. In FIG. 2, the contents of the feature quantity 223 are omitted.

The registered face image 224 is a face image of each of the persons having pieces of registered-person information thereon stored in the registered-person information memory unit 220. In FIG. 2, a graphic image produced based on image data representing each of the face images is shown as the registered face image 224. Alphabets A to I with which the persons are discriminated from one another are written in respective graphic images.

Figure 3:
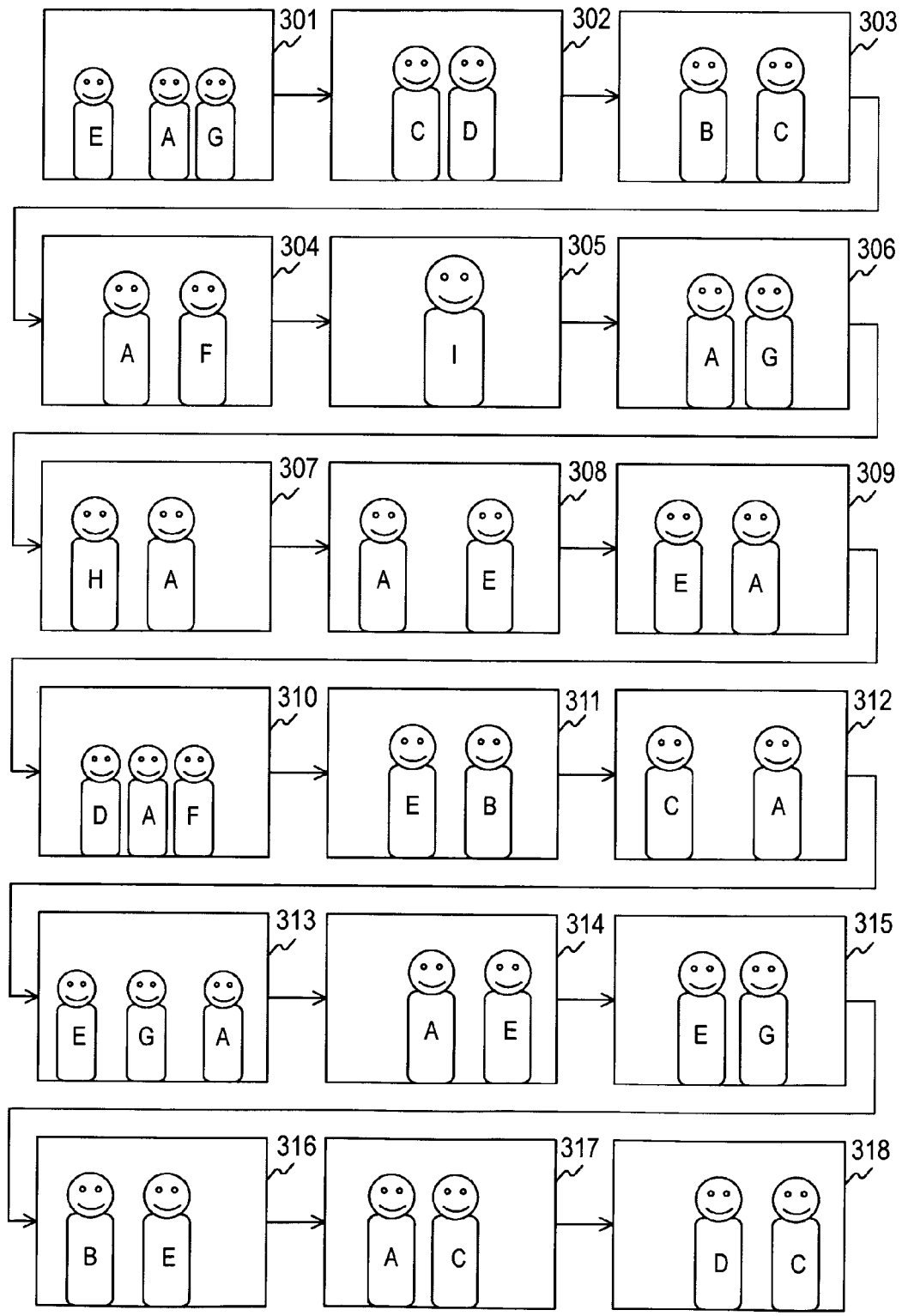
FIG. 3 is a diagram illustratively showing images stored in an image memory unit employed in the first embodiment of the present invention.

FIG. 3 is a diagram illustratively showing the images stored in the image memory unit 210 employed in the first embodiment of the present invention. Images 301 to 318 shown in FIG. 3 are still images recorded by an imaging device such as a digital still camera, and are inputted from the image input unit 110 and stored in the image memory unit 210. One person or multiple persons shall appear in the images 301 to 318. In FIG. 3, alphabets A to I are written in the center parts of the bodies of persons in order to discriminate the persons, who appear in the images 301 to 318, from one another. The persons bearing the same alphabet in the images shall represent the same person. For example, the image 301 is an image in which the persons E, A, and G are recorded to line up in that order from the left thereof. The image 302 is an image in which the persons C and D are recorded to lie side by side in that order from the left thereof. In FIG. 3, the images 301 to 318 are time-sequentially juxtaposed. Namely, on a time base, the image 301 is the oldest image and the image 318 is the newest image.

For example, assuming that a user owing a digital still camera participates in a group tour, the digital still camera is presumably used to take commemorative pictures at sightseeing spots. As the commemorative pictures, an image similar to the image 305 in which only one person appears, and images similar to the other images in which multiple persons appear, in front of a sight of various places, are often recorded. When a commemorative picture is taken with multiple persons regarded as subjects, persons who are close to each other are often taken a picture together. Namely, there is a high possibility that persons appearing together in the same image have a deep human relationship. In the first embodiment of the present invention, the depth in the human relationship between persons appearing in the same image is taken into account. The human relationship is numerically indicated in order to estimate the depth in the direct or indirect human relationship between persons. Based on the estimation, the priorities of persons relating to a specific person are determined.

In the registered-person information memory unit 220 shown in FIG. 2, pieces of registered-person information to be used to discriminate the persons A to I from one another are stored. For example, when the images 301 to 318 are sequentially inputted from the image input unit 110, the face detection unit 120 sequentially detects the faces of the persons A to I in the images 301 to 318. Thereafter, the face discrimination unit 130 uses the feature quantities relevant to the persons A to I, which are stored in the registered-person information memory unit 220, to discriminate the faces of the persons A to I from one another while comparing them with the detected faces. The results of face discrimination are sequentially recorded in the results-of-face discrimination memory unit 200. The results of face discrimination will be detailed later with reference to FIG. 4.

FIG. 4 is a diagram schematically showing the contents of the results-of-face discrimination memory unit 200 employed in the first embodiment of the present invention. In the results-of-face discrimination memory unit 200, the relationships between the images inputted from the image input unit 110 and the registered persons detected in the images are stored as the results of face discrimination. In the example shown in FIG. 4, the contents of the results-of-face discrimination memory unit 200 signify that when pieces of registered-person information to be used to discriminate the persons A to I from one another are stored in the registered-person information memory unit 220, the images 301 to 318 shown in FIG. 3 are inputted. In FIG. 4, pieces of discrimination information signifying the images 301 to 318 shall be P301 to P318, and pieces of discrimination information signifying the persons A to I shall be A to I. In FIG. 4, if the face of a registered person is detected in each of the images 301 to 318, a circle is specified in the column allocated to the person. In contrast, if the face of a registered person is not detected, a hyphen (-) is specified in the column for the person. For example, the persons A, E, and G appear in the image 301. Therefore, the circle is specified in the columns for A, E, and G in association with P301, and the hyphen is specified in the other columns.

As mentioned above, in the results-of-face discrimination memory unit 200, the results of face discrimination performed on the registered persons detected in the images outputted from the image input unit 110 are stored in association with the images. The results of face discrimination stored in the results-of-face discrimination memory unit 200 are used to calculate depth-of-relationship values. A method of calculating the depth-of-relationship values will be detailed below with reference to the drawings.

[Example of Determination of Priorities]

Figures 5A, 5B:
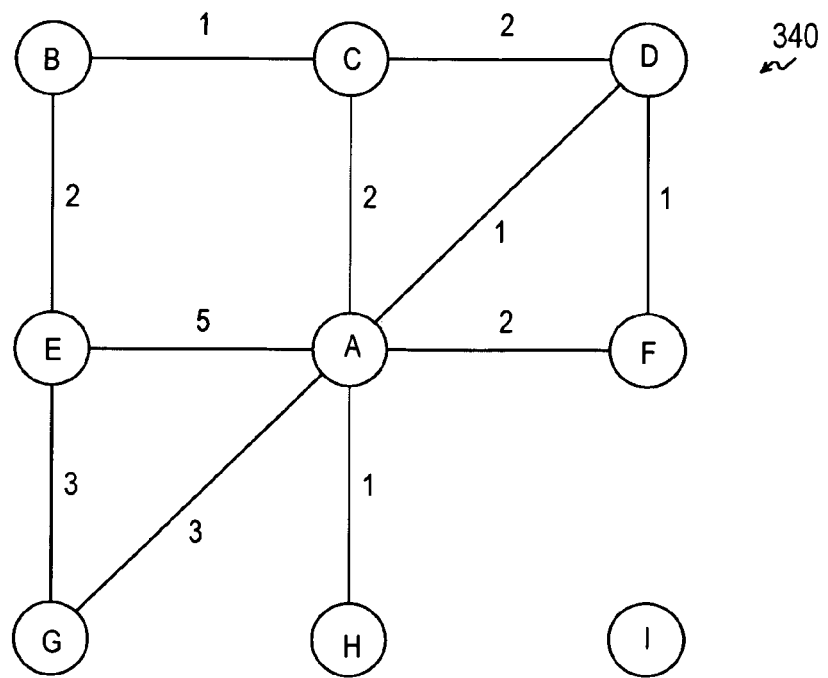
FIGS. 5A and 5B are diagram showing a human relationship table and a human relationship chart created based on the contents of the results-of-face discrimination memory unit employed in the first embodiment of the present invention.

FIGS. 5A and 5B are diagrams showing a human relationship table and a human relationship chart which are created based on the contents of the results-of-face discrimination memory unit 200 employed in the first embodiment of the present invention. The numerical values presented by the human relationship table 330 and human relationship chart 340 shown in FIGS. 5A and 5B respectively are calculated by the depth-of-relationship value calculation unit 150. FIG. 5A shows the human relationship table 330 in which the numerical values indicate the relationships between pairs of persons among the persons A to I appearing in the images 310 to 318. FIG. 5B shows the human relationship chart 340 in which blank circles indicating the persons A to I are two-dimensionally arranged in order to two-dimensionally express the relationships between the pairs of persons among the persons A to I. In the example shown in FIGS. 5A and 5B, when multiple persons appear in the same image, 1 is added in order to indicate the relationship between each pair of persons among the multiple persons appearing in the same image. For example, when three persons A, E, and G appear in the same image in the same manner as they do in the image 301, 1 is added in order to indicate the relationship between the persons A and E, the relationship between the persons E and G, and the relationship between the persons G and A. When the two persons C and D appear in the same image similarly to they do in the image 302, 1 is added in order to indicate the relationship between the persons C and D. Thus, 1 is sequentially added in order to indicate the relationships between pairs of persons among multiple persons appearing in the same image. Eventually, the relationships between the pairs of persons among the persons A to I appearing in the images 310 to 318 are indicated with numerical values (scores). For example, the images in which the persons A and C appear together are limited to the images 312 and 317. Therefore, 2 (1+1) is recorded in a space in the human relationship table 330 in which the relationship between the persons A and C is supposed to be specified. For example, an image in which the persons A and B appear together is not found among the images 310 to 318. Therefore, 0 is recorded in a space in the human relationship table 330 in which the relationship between the persons A and B is supposed to be specified. Numerical values indicating the relationships between the other pairs of persons are calculated in the same manner, and are recorded in spaces in the human relationship table 330 in which the relationships between the respective pairs of persons are supposed to be specified.

As shown in FIG. 5B, the contents of the human relationship table 330 shown in FIG. 5A may be expressed as a two-dimensional human relationship chart. In the human relationship chart shown in FIG. 5B, the persons A to I are expressed with blank circles, and pieces of discrimination information (A to I) on the persons are entered in the circles. For example, when multiple persons appear in the same image, the blank circuits expressing two persons included in the multiple persons is linked by a straight line, and a score calculated for the two persons expressed to be linked by the straight line is appended to the straight line. For example, two persons expressed to be linked by a straight line appear at least in one image, and are therefore estimated to have a relatively deep relationship. Two persons who are not expressed to be directly linked but are expressed to be indirectly linked via one person or several persons are also estimated to have a relatively deep relationship.

For example, the person B is expressed to be directly linked to each of the persons C and E by a straight line, and is therefore estimated to have a relatively deep relationship to each of the persons C and E. Further, the person B is not expressed to be directly linked to each of the persons A, D, and G by a straight line but is expressed to be indirectly linked to each of them via one person (person C or E), and is therefore estimated to have a moderately deep relationship to each of the persons A, D, and G. Further, the person B is not expressed to be directly linked to each of the persons F and H by a straight line, but is expressed to be indirectly linked to each of them via at least two persons (person A, C, D, E, or G), and is therefore estimated to have a moderately deep relationship to each of the persons F and H. However, the person B is neither expressed to be directly nor indirectly linked to the person I, and is therefore estimated not to have a deep relationship to the person I. Thus, a human relationship chart to be created based on the contents of the results-of-face discrimination memory unit 200 may be used to calculate depth-of-relationship values, which indicate human relationships between pairs of registered persons, for each of the persons.

FIGS. 6A and 6B are diagrams showing an example of depth-of-relationship values obtained based on the contents of the results-of-face discrimination memory unit 200 employed in the first embodiment of the present invention, and an example of priorities determined based on the depth-of-relationship values. FIG. 6A shows as the example of depth-of-relationship values a table 350 of depth-of-relationship values concerning a person A. The depth-of-relationship values concerning each of persons listed in the table 350 are calculated by the depth-of-relationship value calculation unit 150. In the table 350, the persons 351, zero-order depth-of-relationship values 352, and first-order depth-of-relationship values 353 are listed in association with one another.

The persons 351 are persons other than a person (specific person) for which calculation is carried out. FIG. 6A shows the example in which the specific person is the person A. The persons 351 therefore refer to the persons B to I. Designation of the specific person will be detailed later with reference to FIGS. 8A and 8B.

The zero-order depth-of-relationship values 352 are depth-of-relationship values calculated for the specific person on the basis of the relationships of the specific person to the persons appearing together in the same images (direct relationships). In the example shown in FIG. 6A, the depth-of-relationship values are calculated based on the direct relationships of the person A and the persons B to I. More particularly, the zero-order depth-of-relationship values are the numerical values specified in the row for the person A (spaced on the first row) in the human relationship table 330 shown in FIG. 5A.

The first-order depth-of-relationship values 353 are depth-of-relationship values calculated based on the relationships (indirect relationships) to the second person via the third person other than the specific person in multiple images. In the example shown in FIG. 6A, the depth-of-relationship values calculated based on the indirect relationships of the person A and the persons B to I are listed. More particularly, when the first-order depth-of-relationship values concerning the pairs of the person A and the other person (second person) are calculated, scores indicating the indirect links established via the third person other than the person A and the second person are added up. For example, when it says that the person A and person B are indirectly linked via the third person other than the person A and person B, it means that the person A and person B are, as shown in FIG. 5B, indirectly linked via the person C or E. Therefore, when the person A and person B are indirectly linked via the person C, a score (2) calculated for the pair of the persons A and C and a score (1) calculated for the pair of the persons C and B are multiplied by each other. Thus, a product for the relationship via the person C is calculated (2). Likewise, when the persons A and B are indirectly linked via the person E, a score (5) calculated for the pair of the persons A and E and a score (2) calculated for the pair of the persons E and B are multiplied by each other. Thus, a product indicating the relationship via the person E is calculated (10). Thereafter, the product (2) indicating the relationship via the person C and the product (10) indicating the relationship via the person E are added up. Thus, the first-order depth-of-relationship value (2+10) concerning the pair of the persons A and B is calculated.

As mentioned above, the priority determination unit 160 uses the zero-order depth-of-relationship values and first-order depth-of-relationship values, which are calculated by the depth-of-relationship value calculation unit 150, to determine priorities relevant to the person A. As a method for determining priorities, for example, a determining method according to which: as shown in FIG. 6B, priorities are determined based on the zero-order depth-of-relationship values; and if relationships to persons are ranked with the same zero-order depth-of-relationship value, the priorities to e assigned to the persons are determined using the first-order depth-of-relationship values may be adopted.

FIG. 6B shows a table 360 of priorities relevant to the person A determined based on the values listed in the table 350 of depth-of-relationship values concerning the person A shown in FIG. 6A. As shown in FIG. 6B, relationships to persons may be, similarly to the relationships to the persons C and F, the relationships to persons D and H, or the relationships to persons B and I, ranked with the same zero-order depth-of-relationship value. For the relationships to persons that are ranked with the same zero-order depth-of-relationship value, the priorities to be assigned to the persons are determined based on, for example, the first-order depth-of-relationship values. Alternatively, for example, weighting factors to be applied to the zero-order depth-of-relationship values and first-order depth-of-relationship values may be used to newly calculate depth-of-relationship values, and the priorities may be determined based on the depth-of-relationship values. More particularly, assume that S0 denotes the zero-order depth-of-relationship value and $\alpha$ denotes the weighting factor to be applied to the zero-order depth-of-relationship value, and S1 denotes the first-order depth-of-relationship value and $\beta$ denotes a weighting factor to be applied to the first-order depth-of-relationship value. The weighting factors $\alpha$ and $\beta$ are used to calculate the depth-of-relationship values S ($=\alpha S0+\beta S1$) for each of the persons B to I. Based on the thus calculated depth-of-relationship values S, the priorities may be determined. Herein, the weighting factors $\alpha$ and $\beta$ are values satisfying, for example, $\alpha > \beta$. The weighting factors may be made changeable through manipulative entry performed by a user.

As mentioned above, the priority determination unit 160 determines the priorities on the basis of the zero-order depth-of-relationship values and first-order depth-of-relationship values. The determined priorities are preserved in the priority preservation unit 161. Based on the priorities preserved in the priority preservation unit 161, the display control unit 170 may change the displaying sequence for the images 301 to 318, and then display the images on the display unit 180.

In this example, the zero-order depth-of-relationship values and first-order depth-of-relationship values are calculated and the priorities are determined based on the calculated values. However, for example, second-order depth-of-relationship values may be calculated for the relationships to the fourth persons established via two persons (second and third person) other than a specific person appearing in multiple images, and priorities may be determined based on the zero-order to second-order depth-of-relationship values. Otherwise, n-th-order depth-of-relationship values may be calculated for the relationships to persons established via m ($m \geq 3$) or more persons other than a specific person appearing in multiple images, and priorities may be determined based on the zero-order to n-th-order depth-of-relationship values. Incidentally, the larger the number of images concerned or the number of registered persons is, the larger the number of calculations is. As the n value gets larger, the significance of the n-th-order depth-of-relationship value diminishes. Therefore, the calculation of the n-th-order depth-of-relationship values should be ceased on an appropriate stage. For example, the calculation may be ceased on a stage on which there are no persons relationships to whom are ranked with the same n-th-order depth-of-relationship value.

[Example of Display of Images]

Figure 7:
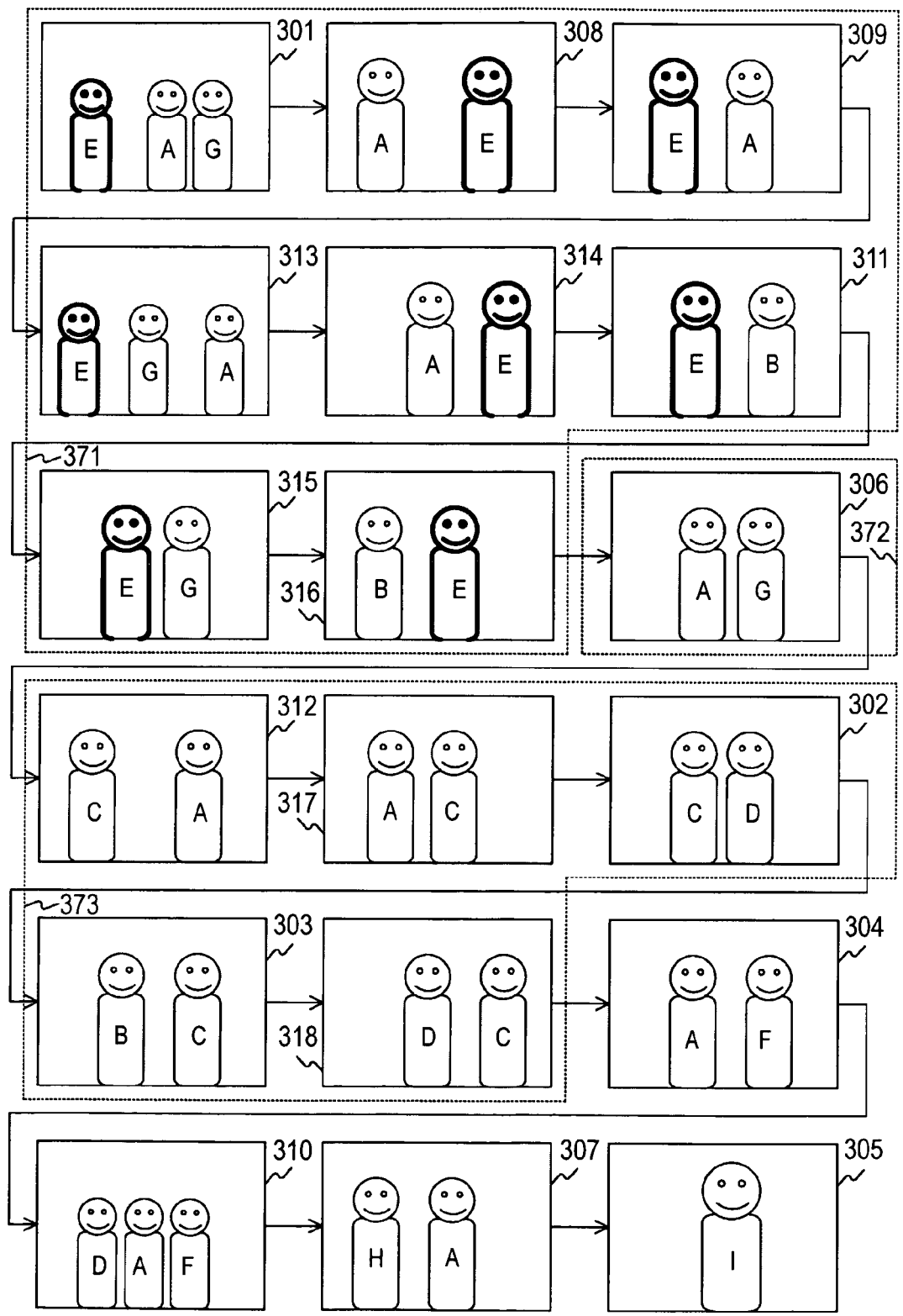
FIG. 7 is a diagram showing an example of a displaying sequence in which the images stored in the image memory unit employed in the first embodiment of the present invention are displayed on a display unit.

FIG. 7 is a diagram showing an example of a displaying sequence employed when the images 301 to 318 stored in the image memory unit 210 employed in the first embodiment of the present invention are displayed on the display unit 180. FIG. 7 shows an example in which the images 301 to 318 time-sequentially arranged in FIG. 3 are sorted according to priorities. For example, among the images 301 to 318 stored in the image memory unit 210, images in which the person E to which the first priority is assigned as shown in FIG. 6B appears are arranged on the early stage of a displaying sequence. In FIG. 7, an image group 371 shall be a group of images in which the person E appears, and the face and body of the person E appearing in the images belonging to the image group 371 are delineated with a bold line. Within the image group 371, images in which the person A appears may be arranged on the early stage of the displaying sequence, and images in which persons other than the person A appear but the person A does not appear may be arranged on the second-half side of the displaying sequence. For example, if the person A appears in multiple images, the images that come on the early stage of a time base are arranged on the early stage of the displaying sequence. Likewise, when persons other than the person A appear in multiple images in which the person A does not appear, the images that come on the early stage of the time base are arranged on the early stage of the displaying sequence. Likewise, an image group 372 shall be a group of images in which the person G to which the second priority is assigned as shown in FIG. 6B appears. The images 301, 313, and 315 in which the person G appears belong to the group of images 371. Therefore, the image 306 alone belongs to the image group 372. An image group 373 shall be a group of images in which the person C to which the third priority is assigned as shown in FIG. 6B appears. The other images can also be sorted according to priorities.

Figure 8A:
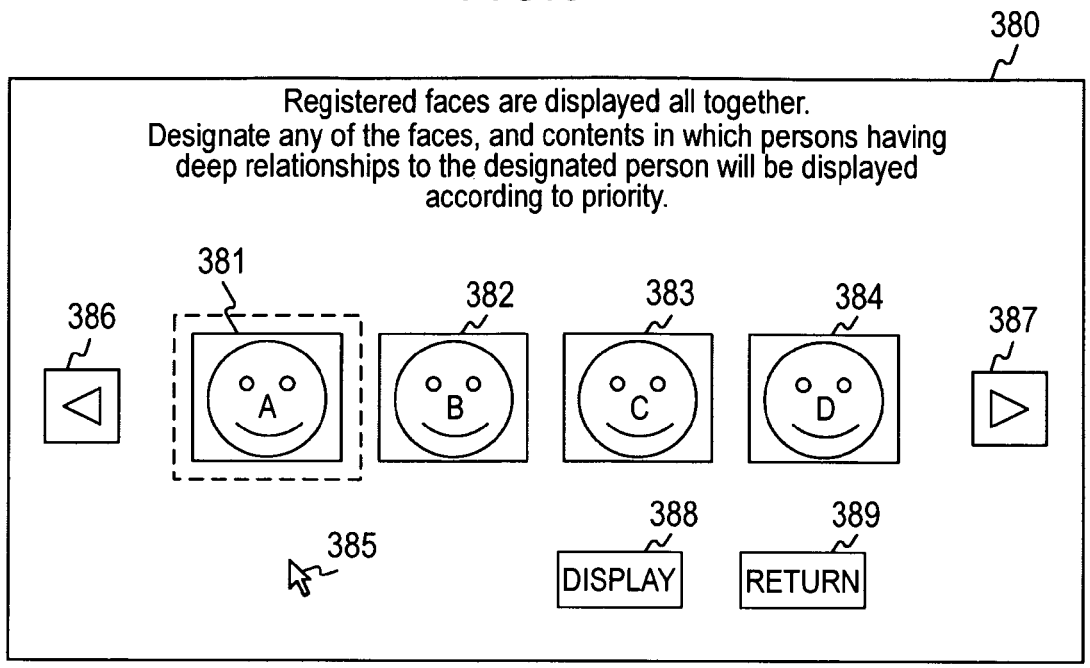
FIGS. 8A and 8B are diagrams showing examples of display screen images displayed on the display unit employed in the first embodiment of the present invention.
Figure 8B:
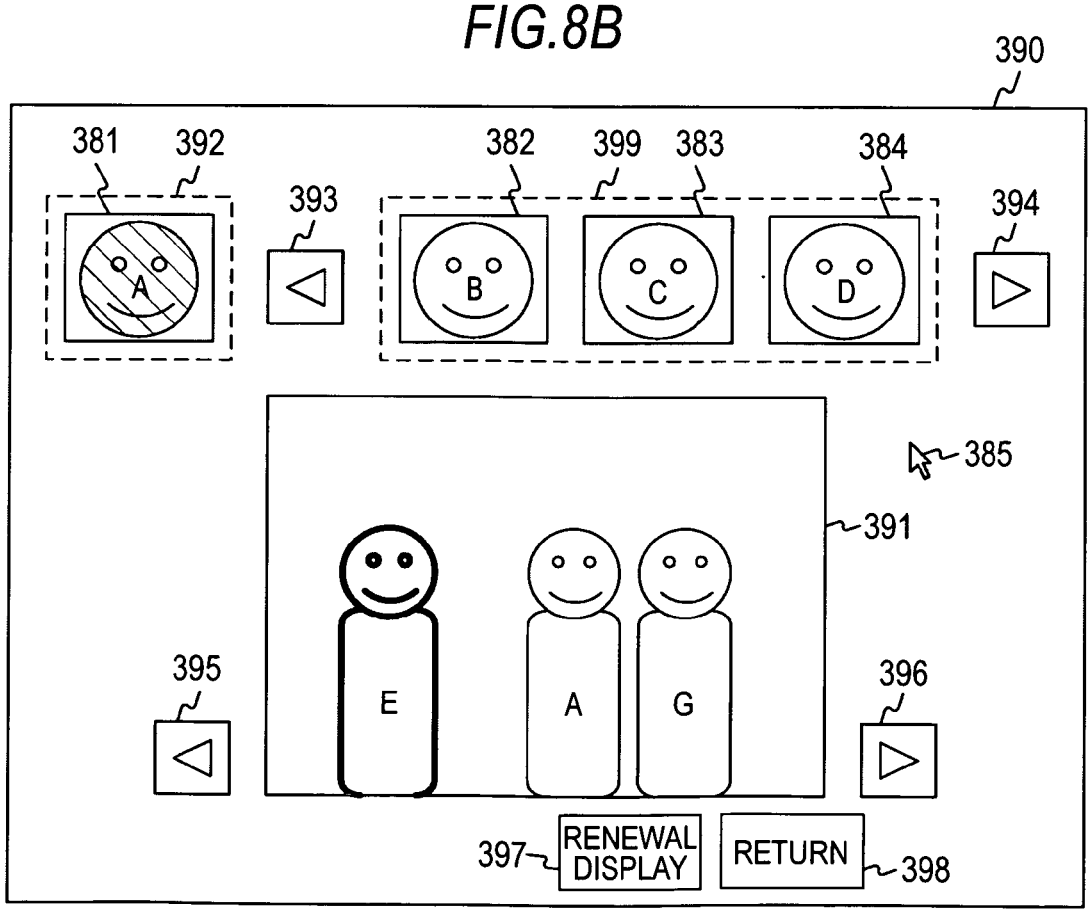

FIGS. 8A and 8B are diagrams showing examples of display screen images displayed on the display unit 180 employed in the first embodiment of the present invention.

FIG. 8A shows a face image designation screen image 380 through which a registered face image is designated. FIG. 8B shows a display screen image 390 through which images are displayed according to determined priorities with a person of the designated registered face image regarded as a specific person.

The face image designation screen image 380 is a screen image through which a desired person is designated by displaying registered face images, which are stored in the registered-person information memory unit 220, all together. In the face image designation screen image 380, one registration face image or multiple registration face images out of the registered face images stored in the registered-person information memory unit 220, a Left button 386, a Right button 387, a Display button 388, and a Return button 389 are contained. As the registered face images stored in the registered-person information memory unit 220, for example, registered face images 381 to 384 of the persons A to D out of the multiple persons are displayed. In FIG. 8A, a letter representing a person is appended to the center of a face in each of the registered face images. For example, since the registered face image 381 is a face image of the person A, letter A is appended to the center of a face contained in the registered face image 381. When a cursor 385 is used to depress the Left button 386 or Right button 387 so as to thus move the registered face images 381 to 384 leftward or rightward, registered face images of persons other than the persons A to D can be displayed. When a designating manipulation of designating any of the displayed registered face images 381 to 384 is performed using the cursor 385, a marker is appended to the perimeter of the designated registered face image. In FIG. 8A, a marker of a dashed line is appended to the perimeter of the registered face image 381.

As mentioned above, when any of the registered face images that are displayed all together has been designated, if a depressing manipulation of depressing the Display button 388 is performed using the cursor 385, depth-of-relationship values concerning the person of the designated registered face image are calculated. Based on the calculated depth-of-relationship values, priorities relevant to the person (specific person) of the designated registered face image are determined. According to the priorities, the images stored in the image memory unit 210 are displayed as shown in FIG. 8B. When the Return button 389 is depressed, the display states of the display unit 180 are changed to restore the display screen image immediately preceding the face image designation screen image 380.

The display screen image 390 shown in FIG. 8B is a screen image through which the images stored in the image memory unit 210 are displayed according to the priorities relevant to the specific person of the registered face image designated through the face image designation screen image 380. In the display screen image 390, a display field 391 in which each of the images stored in the image memory unit 210 is displayed, a designated face image field 392 in which the registered face image designated through the face image designation screen image 380 is displayed, a Left button 395, and a Right button 396 are contained. In addition, a Left button 393 and a Right button 394, a Renewal Display button 397, a Return button 398, and a face image field 399 in which one or multiple registered face images out of the registered face images stored in the registered-person information memory unit 220 are displayed are defined in the display screen image 390. In the face image field 399, the registered face images 382 to 384 contained in the face image designation screen image 380 being displayed immediately previously are displayed.

For example, the registered face image 381 designated through the face image designation screen image 380 is displayed in the designated face image field 392. In the display field 391, the images stored in the image memory unit 210 are sequentially displayed according to the priorities relevant to the specific person of the registered face image displayed in the designated face image field 392. If a depressing manipulation is performed on the Left button 395 or Right button 396 using the cursor 385, the images to be displayed in the display field 391 are moved leftward or rightward according to the priorities. After any of the registered face images displayed all together in the face image field 399 is newly designated, if a depressing manipulation of depressing the Renewal Display button 397 is performed using the cursor 385, depth-of-relationship values concerning the specific person who is the person of the newly designated registered face image are calculated. According to the priorities relevant to the newly designated registered face image, the images stored in the image memory unit 210 are displayed. When the Return button 398 is depressed, the display states of the display unit 180 are changed to restore the face image designation screen image 380 having been displayed immediately previously.

In the example shown in FIG. 8B, the images stored in the image memory unit 210 are displayed one by one. Alternatively, multiple images belonging to an image group determined based on priorities may be displayed in units of the image group. The display control unit 170 may display the images, which are stored in the image memory unit 210, in the display field 391 according to priorities, and may display the registered face images, which are stored in the registered-person information memory unit 220, in the designated face image field 392 according to the priorities.

For example, a large number of images is sequentially inputted to the image input unit 110, and the pieces of registered-person information on persons appearing in the images are sequentially recorded in the registered-person information memory unit 220. When the registered names 222 (see FIG. 2) included in the pieces of registered-person information recorded in the registered-person information memory unit 220 are manually entered by a user, the registered face images may be sequentially displayed according to priorities, and the registered names may be entered in descending order of priorities. In this case, the work of registering the pieces of registered-person information can be efficiently carried out.

[Example of Actions to be Performed in the Image Processing Apparatus]

Next, actions to be performed in the image processing apparatus 100 in accordance with the first embodiment of the present invention will be described with reference to the drawings.

Figure 9:
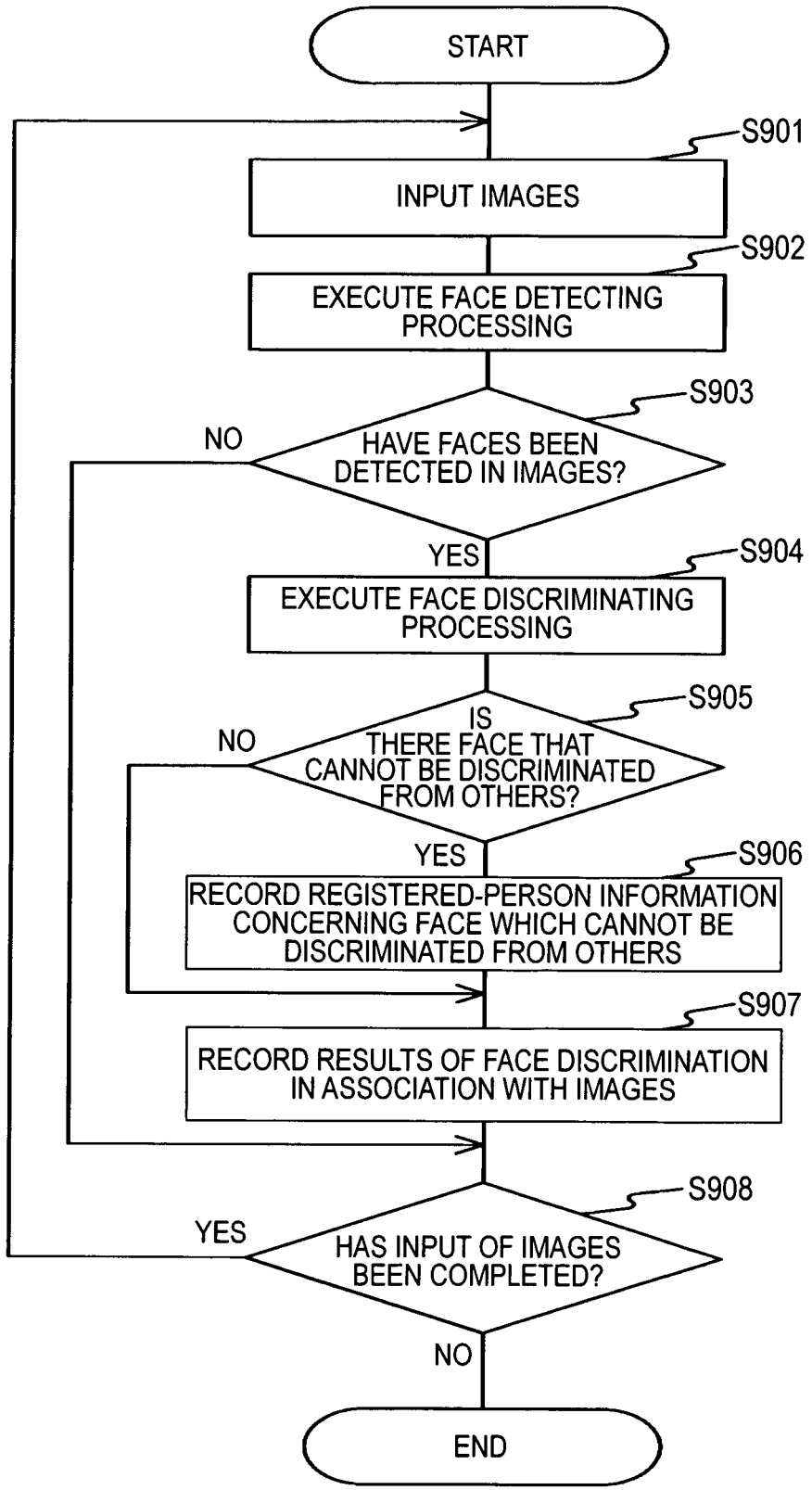
FIG. 9 is a flowchart showing a processing procedure for results-of-face discrimination recording processing to be performed in the image processing apparatus in accordance with the first embodiment of the present invention.

FIG. 9 is a flowchart showing a processing procedure for results-of-face discrimination recording processing to be performed in the image processing apparatus 100 in accordance with the first embodiment of the present invention.

First, the image input unit 110 inputs images (step S901). Thereafter, the face detection unit 120 performs face detecting processing on the inputted images (step S902). Thereafter, the face detection unit 120 decides whether faces have been detected (step S903). Unless faces are detected, the procedure proceeds to step S908. In contrast, if the face detection unit 120 has detected faces (step S903), the face discrimination unit 130 performs face discriminating processing on the detected faces (step S904).

Thereafter, whether a face that is not discriminated from others is included in the detected faces is decided (step S905). If the face that is not discriminated from others is not included, the procedure proceeds to step S907. If the face that is not discriminated from others is included (step S905), the recording control unit 140 records a feature quantity and a face image, which represent the face, as registered-person information on a newly registered person in the registered-person information memory unit 220 (step S906). Thereafter, the recording control unit 140 records the results of face discrimination performed on the detected faces in the results-of-face discrimination memory unit 200 in association with the images (step S907). Whether image input from the image input unit 110 has been completed is decided (step S908). If image input has been completed, the action of performing results-of-face discrimination recording processing is terminated. In contrast, if image input from the image input unit 110 is not completed (step S908), the procedure is returned to step S901.

Figure 10:
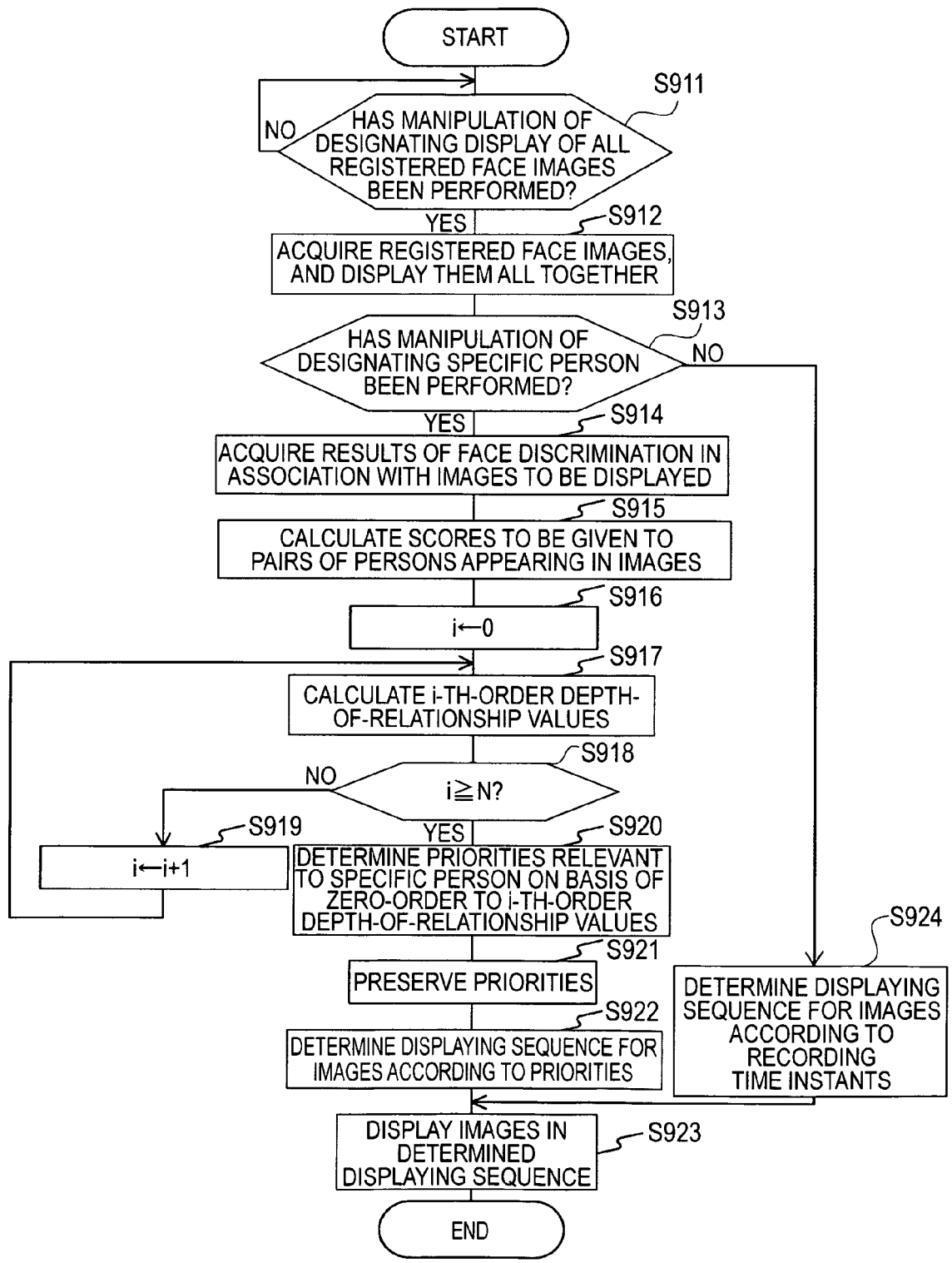
FIG. 10 is a flowchart showing a processing procedure for image displaying processing to be performed in the image processing apparatus in accordance with the first embodiment of the present invention.

FIG. 10 is a flowchart showing a processing procedure for image displaying processing to be performed in the image processing apparatus 100 in accordance with the first embodiment of the present invention.

First, whether a designating manipulation performed in order to display the registered face images stored in the registered-person information memory unit 220 has been recognized by the manipulation recognition unit 190 is decided (step S911). If the designating manipulation has not been recognized (step S911), monitoring is continued until the designating manipulation is recognized. If the designating manipulation has been recognized (step S911), the display control unit 170 acquires the registered face images stored in the registered-person information memory unit 220, and displays the acquired registered face images all together on the display unit 180 (step S912).

Thereafter, whether a designating manipulation of designating one registered face image from among the registered face images displayed all together on the display unit 180 has been recognized by the manipulation recognition unit 190 is decided (step S913). If the designating manipulation of designating the registered face image has been recognized (step S913), the depth-of-relationship value calculation unit 150 acquires the results of face discrimination, which are stored in the results-of-face discrimination memory unit 200, in association with the images to be displayed (step S914). The images to be displayed are the images stored in the image memory unit 210. Thereafter, based on the acquired results of face discrimination, the depth-of-relationship value calculation unit 150 calculates scores to be given to pairs of persons appearing in the images to be displayed (step S915). Thereafter, a variable i is initialized to 0 (step S916). The depth-of-relationship calculation unit 150 calculates i-th-order depth-of-relationship values on the basis of the calculated scores (step S917).

Whether the variable i is equal to or larger than a constant N is decided (step S918). If the variable i falls below the constant N (step S918), the variable i is incremented by one (step S919). The procedure is then returned to step S917. For example, 1 may be adopted as the constant N. If the variable i is equal to or larger than the constant N (step S920), the priority determination unit 160 determines priorities relevant to a specific person on the basis of the calculated zero-order to i-th-order depth-of-relationship values (step S920). The priorities are preserved in the priority preservation unit 161 (step S921). Thereafter, according to the priorities preserved in the priority preservation unit 161, the display control unit 170 determines a displaying sequence for the images to be displayed (step S922). The display control unit 170 then displays the images to be displayed on the display unit 180 in the determined displaying sequence (step S923).

If the designating manipulation of designating the registered face image is not recognized (step S913), the display control unit 170 determines the displaying sequence for the images to be displayed according to the recording time instants of the images to be displayed (step S924). Incidentally, the steps S915 to S919 constitute an example of a depth-of-relationship value calculation step set forth in Claims. The step S920 serves as an example of a priority determination step set forth in Claims.

As described above, according to the first embodiment of the present invention, priorities are determined using scores given to pairs of persons appearing in the same images. More particularly, the scores given to the pairs of persons appearing in the same images are used to calculate the zero-order to i-th-order depth-of-relationship values, and the priorities are determined based on the zero-order to i-th-order depth-of-relationship values. The zero-order depth-of-relationship values calculated based on direct human relationships, and the i-th-order depth-of-relationship values calculated based on indirect human relationships are used to determine the priorities. Therefore, even a person who does not appear together with a specific person in the same image is regarded as an object of calculation of the i-th-order depth-of-relationship value. Eventually, the human relationships of the specific person can be expressed in an interesting form.

<2. Second Embodiment>
[Example of the Configuration of an Image Processing Apparatus]

In the second embodiment of the present invention, an example in which the numbers of persons appearing in the same images or the distances between pairs of persons are taken into account in order to calculate depth-of-relationship values will be described with reference to the drawings.

Figure 11:
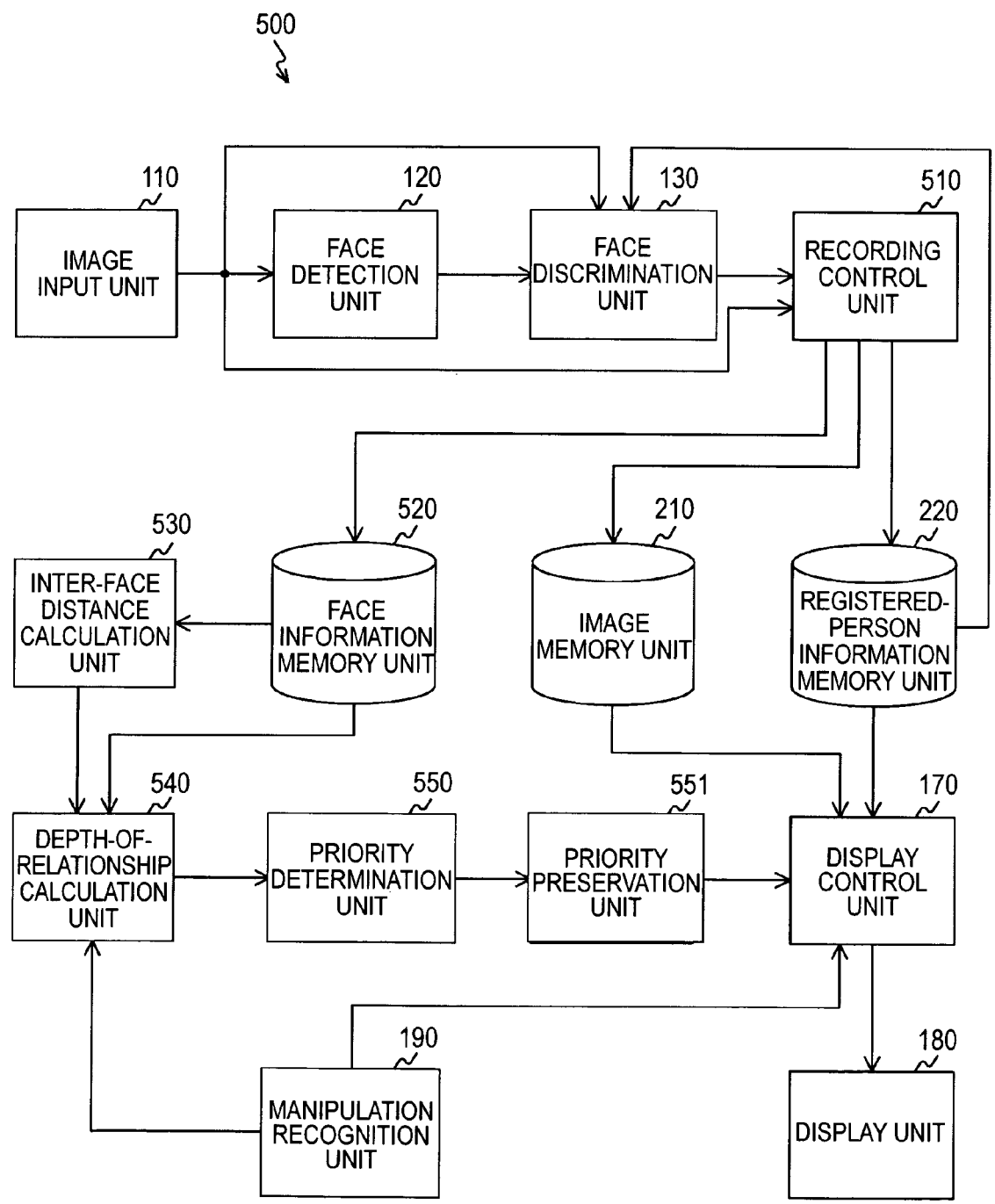
FIG. 11 is a block diagram showing an example of the functional configuration of an image processing apparatus in accordance with a second embodiment of the present invention.

FIG. 11 is a block diagram showing an example of the functional configuration of an image processing apparatus 500 in accordance with the second embodiment of the present invention. The image processing apparatus 500 includes a recording control unit 510, a face information memory unit 520, an inter-face distance calculation unit 530, a depth-of-relationship value calculation unit 540, a priority determination unit 550, and a priority preservation unit 551. The other functional components are substantially identical to those of the image processing apparatus 100 shown in FIG. 1. The same reference numerals as those employed in the image processing apparatus 100 are assigned to the identical components. Components having different functions will be mainly described below, but an iterative description will be omitted.

The recording control unit 510 controls recordings of data items in the face information memory unit 520, image memory unit 210, and registered-person information memory unit 220. More particularly, the recording control unit 510 records images, which are outputted from the image input unit 110, in the image memory unit 210, and records the results of face discrimination and pieces of face-detection information, which are outputted from the face discrimination unit 130, in the face information memory unit 520 in association with the images.

In the face information memory unit 520, the results of face discrimination and pieces of face-detection information which are outputted from the face discrimination unit 130 are stored in association with images, which are objects of discrimination, under the control of the recording control unit 510. The stored results of face discrimination and pieces of face-detection information (pieces of face information) are fed to the inter-face distance calculation unit 530, and the stored results of face discrimination are fed to the depth-ofrelationship calculation unit 540. The face information memory unit 520 will be detailed later with reference to FIG. 13.

The inter-face distance calculation unit 530 calculates the distance between the faces of each pair of persons appearing in each of the images, which are stored in the image memory unit 210, on the basis of the face-detection information stored in the face information memory unit 520. The calculated inter-face distances are outputted to the depth-of-relationship value calculation unit 540 in association with the results of face discrimination. The calculation of the inter-face distances will be detailed later with reference to FIGS. 18A and 18B.

The depth-of-relationship value calculation unit 540 calculates depth-of-relationship values on the basis of the results of face discrimination and pieces of face-detection information stored in the face information memory unit 520, and outputs the calculated depth-of-relationship values to the priority determination unit 550. More particularly, the depth-of-relationship value calculation unit 540 calculates scores, which are given to pairs of persons, on the basis of the appearance frequencies of the pairs of persons, who appear together in the same images, among persons appearing in the images stored in the image memory unit 210, and the numbers of persons appearing together in the same images. The depth-of-relationship value calculation unit 540 calculates scores, which are given to the pairs of persons, on the basis of the appearance frequencies of the pairs of persons, who appear together in the same images the persons, among the persons appearing in the images stored in the image memory unit 210, and the distances between the pairs of persons appearing together in the same images. The zero-order depth-of-relationship values relative to the second person are calculated based on the scores given to the pairs of a specific person and the second person. The first-order depth-of-relationship values relative to the second person are calculated based on the scores given to the pairs of the specific person and the third person, and the scores given to the pairs of the second person and the third person. The depth-of-relationship values to be calculated are selected through manipulative entry performed at the manipulation recognition unit 190 by a user. Calculation of the depth-of-relationship values to be performed in consideration of the numbers of persons appearing in the same images will be detailed later with reference to FIG. 16A to FIG. 17B. Calculation of the depth-of-relationship values to be performed in consideration of the distances between pairs of persons appearing in the same images will be detailed later with reference to FIG. 18A to FIG. 21B.

The priority determination unit 550 determines priorities, which are assigned to multiple persons who have pieces of registered-person information thereon stored in the registered-person information memory unit 220, on the basis of the depth-of-relationship values outputted from the depth-of-relationship value calculation unit 540. The determined priorities are outputted to and preserved in the priority preservation unit 551. Determination of the priorities is identical to that performed in the first embodiment of the present invention except a point that the depth-of-relationship values to be used for determination are different. The determination of the priorities will be detailed later with reference to FIG. 16A to FIG. 21B.

The priority preservation unit 551 preserves the priorities outputted from the priority determination unit 550. The preserved priorities are fed to the display control unit 170.

Figure 12A:
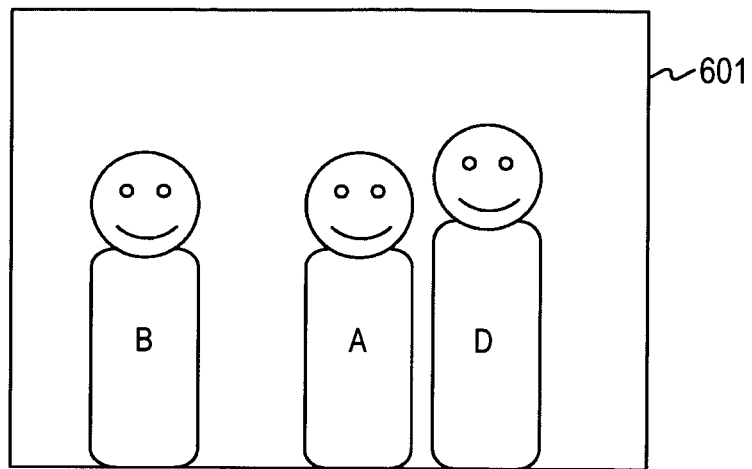
FIGS. 12A to 12C are diagrams illustratively showing images stored in the image memory unit employed in the second embodiment of the present invention.
Figure 12B:
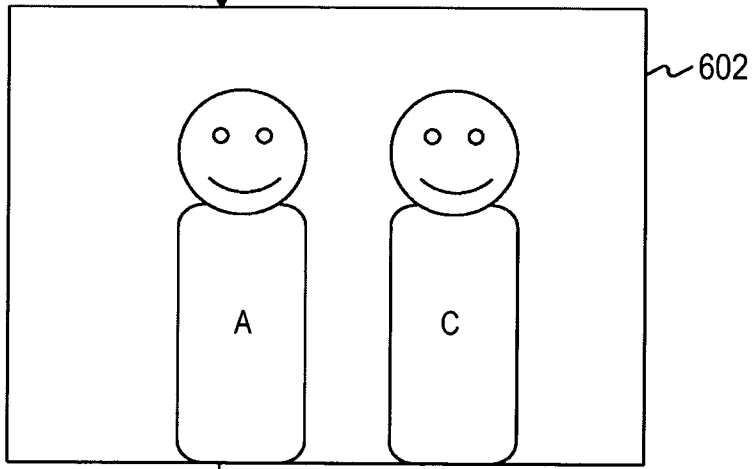
Figure 12C:
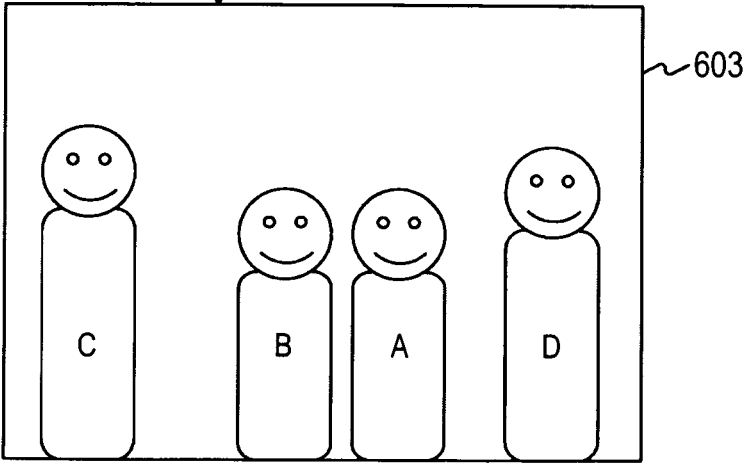

FIGS. 12A to 12C are diagrams illustratively showing images stored in the image memory unit 210 employed in the second embodiment of the present invention. Images 601 to 603 shown in FIG. 12A to 12C are still images recorded by an imaging device such as a digital still camera, inputted by the image input unit 110, and stored in the image memory unit 210. Multiple persons shall appear in the images 601 to 603. In FIGS. 12A to 12C, alphabets A to D are appended to the centers of bodies of persons appearing in the images 601 to 603 in order to discriminate the persons from one another. Namely, the persons appearing in the images with the same alphabet appended thereto shall refer to the same person. In FIGS. 12A to 12C, the images 601 to 603 are time-sequentially arranged. On a time base, the image 601 is the oldest image, and the image 603 is the newest image.

FIG. 13 is a diagram schematically showing the contents of the face information memory unit 520 employed in the second embodiment of the present invention. In the face information memory unit 520, the images inputted by the image input unit 110, the relationships to registered persons detected in the images, and pieces of face-detection information on the detected registered persons are stored. In the example shown in FIG. 13, the contents of the memory unit signify that when the pieces of registered-person information to be used to discriminate the persons A to D from one another are stored in the registered-person information memory unit 220, the images 601 to 603 shown in FIGS. 12A to 12C are inputted. In FIG. 13, pieces of discrimination information representing the images 601 to 603 are specified as P601 to P603, and pieces of discrimination information representing the persons A to D are specified as A to D. For example, if the faces of the registered persons are detected in the images 601 to 603, pieces of face-detection information (positions of faces in each of images and sizes thereof) are stored in association with the persons. In FIG. 13, when the faces of the registered persons are not detected, a hyphen (-) is entered in the associated columns. For example, since the persons A, B, and D appear in the image 601, pieces of face-detection information detected in relation to the persons A, B, and D are specified in the columns for A, B, and D associated with P601. For example, as the pieces of face-detection information detected in relation to the person A appearing in the image P601, the position of the face in the image (X11,Y11), and the size of the face in the image (H11,W11) are specified.

As mentioned above, in the face information memory unit 520, the results of face discrimination and pieces of face-detection information concerning persons detected in images inputted by the image input unit 110 are stored in association with the images. Depth-of-relationship values are calculated using the results-of-face discrimination and pieces of face-detection information which are stored in the face information memory unit 520. A method of calculating the depth-of-relationship values will be described below with reference to the drawings.

[Example of Determination of Priorities]

Figures 14A, 14B:
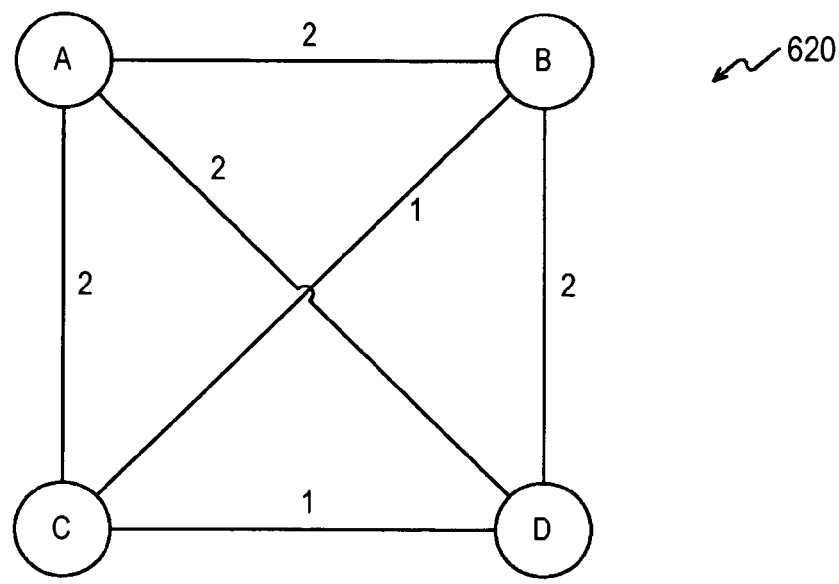
FIGS. 14A and 14B are diagrams showing a human relationship table and a human relationship chart created based on the contents of the face information memory unit employed in the second embodiment of the present invention.

FIGS. 14A and 14B are diagrams showing a human relationship table and a human relationship chart that are created based on the contents of the face information memory unit 520 employed in the second embodiment of the present invention. FIG. 14A shows the human relationship table 610 in which the relationships between pairs of persons among the persons A to D appearing in the images 601 to 603 are indicated with numerical values. FIG. 14B shows the human relationship chart 620 in which blank circles expressing the persons A to D are two-dimensionally disposed in order to two-dimensionally indicate the relationships between the pairs of persons among the persons A to D. The human relationship table 610 and human relationship chart 620 shown in FIGS. 14A and 14B are created in the same manner as the human relationship table 330 and human relationship chart 340 shown in FIGS. 5A and 5B are. An iterative description will be omitted.

FIGS. 15A and 15B are diagrams showing an example of depth-of-relationship values obtained based on the contents of the face information memory unit 520 employed in the second embodiment of the present invention, and an example of priorities determined based on the depth-of-relationship values. FIG. 15A shows as the example of depth-of-relationship values a table 630 of depth-of-relationship values concerning the person A. In the table 630, persons, images, zero-order depth-of-relationship values 631, and first-order depth-of-relationship values 632 are listed in association with one another. The table 630 shown in FIG. 15A is identical to the table 350 shown in FIG. 6A except that the contents thereof concerning the images 601 to 603 are different and sums of values are appended. An iterative description will be omitted. Numerical values written in parentheses in the column for the zero-order depth-of-relationship value 631 are the percentages to the sum at which the zero-order depth-of-relationship values relative to the respective persons occupy the sum.

FIG. 15B shows a table 640 of priorities relevant to the person A determined based on the values specified in the table 630 of depth-of-relationship values concerning the person A shown in FIG. 15A. The priorities are determined in the same manner as they are in the first embodiment of the present invention. For example, the image 603 in which three persons (persons B to D) appear in addition to the person A is compared with the image 602 in which one person (person C) appears in addition to the person A. In this case, the possibility that the relationship of the person A to the person C shown in the image 602 obtained by photographing a so-called two-shot is deeper than the relationships of the person A to the three persons (persons B to D) appearing in the image 603 obtained by photographing many persons is thought to be high.

If the distance between persons appearing in the same image is short, the possibility that the human relationship between the persons having the short distance between them is deep is thought to be high. For example, the relationship between the persons A and B appearing in the image 601 shown in FIG. 12A and the relationship between the persons A and D will be discussed. In the image 601, the distance between the persons A and D is shorter than the distance between the persons A and B. Therefore, the possibility that the human relationship of the person A to the person D having the short distance from the person A is deeper than the human relationship of the person A to the person B having a far distance from the person A is thought to be high. An example in which depth-of-relationship values are calculated in consideration of features of pairs of persons appearing in the same images will be described below. As the feature between a pair of persons, the number of persons appearing in the same image or the distance between the persons appearing in the same image will be taken into consideration.

[Example in which Priorities are Determined in Consideration of the Numbers of Persons Appearing in the Same Images]

Figures 16A, 16B:
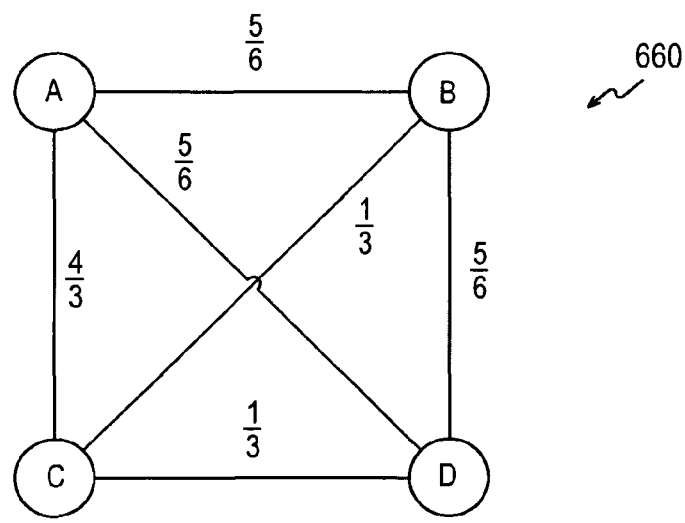
FIGS. 16A and 16B are diagrams showing a human relationship table and a human relationship chart created based on the contents of the face information memory unit employed in the second embodiment of the present invention.

FIGS. 16A and 16B are diagrams showing a human relationship table and a human relationship chart that are created based on the contents of the face information memory unit 520 employed in the second embodiment of the present invention. Numerical values specified in the human relationship table 650 and human relationship chart 660 shown in FIGS. 16A and 16B are calculated by the depth-of-relationship value calculation unit 540. FIG. 16A shows the human relationship table 650 in which the relationships between pairs of persons among the persons A to D appearing in the images 601 to 603 are indicated with the numerical values. FIG. 16B shows the human relationship chart 660 in which the relationships between the pairs of persons among the persons A to D are two-dimensionally expressed by two-dimensionally arranging blank circles that express the persons A to D. FIGS. 16A and 16B are concerned with a case where multiple persons appear in the same images, and values obtained by taking account of the numbers of persons appearing in the same images are added up in order to indicating each of pairs of persons among the multiple persons appearing in the same images. More particularly, assuming that n denotes the numbers of persons appearing in the same images, $1/(n-1)$ is calculated. $1/(n-1)$ may be adopted as the numerical value indicating the relationship between a pair of persons.

For example, when the three persons A, B, and D appear in the same image similar to the image 601, ½ is added in order to indicate each of the relationship between the persons A and B, the relationship between the persons B and D, and the relationship between the persons D and A. When the two persons A and C appear in the same image similar to the image 602, 1 is added in order to indicate the relationship between the persons A and C. When the four persons A to D appear in the same image similar to the image 603, ⅓ is added in order to indicate each of the relationships between the pairs of persons among the persons A to D. Thus, the values obtained in consideration of the numbers of persons appearing in the same images are added up in order to indicate the relationships between pairs of persons appearing in the same images. Eventually, the relationships between the pairs of persons among the persons A to D appearing in the images 601 to 603 are indicated with the numerical values (scores).

For example, the images in which the persons A and B appear together include the images 601 and 603. The numerical value indicating each of the relationships between the pairs of persons appearing in the image 601 is ½. The numerical value indicating each of the relationships between the pairs of persons appearing in the image 603 is ⅓. Therefore, ⅚ is specified in a space in the human relationship table 650 used to indicate the relationship between the persons A and B. For example, the image in which the persons B and C appear together is the image 603 alone. The numerical value indicating the relationship between the persons appearing in the image 603 is ⅓. Therefore, ⅓ is specified in a space in the human relationship table 650 used to indicate the relationship between the persons B and C. The values indicating the relationships between the other pairs of persons are calculated in the same manner, and specified in spaces in the human relationship table 650 used to indicate the relationships between the pairs of persons. In FIG. 16A, the values to be added up are specified in brackets on the right side of the sum of the values indicating the relationship between each pair of persons.

As shown in FIG. 16B, the contents of the human relationship table 650 shown in FIG. 16A may be expressed in the form of a two-dimensional human relationship chart. In the human relationship chart 660 shown in FIG. 16B, the persons A to D are expressed with blank circles, and pieces of discrimination information (A to D) on the persons are appended to the circles. The human relationship chart is identical to the human relationship chart 340 shown in FIG. 5B except that the numerical values calculated for pairs of persons expressed to be linked by straight lines are different. An iterative description will therefore, be omitted. When the human relationship chart 660 is compared with the human relationship chart 620 shown in FIG. 14B, the numerical values calculated for the pairs of persons expressed to be linked by straight lines are different. For example, in the human relationship chart 620, the scores calculated to indicate the relationship between the persons A and B and the relationship between the persons A and C are 2. In contrast, in the human relationship chart 660, the score calculated to indicate the relationship between the persons A and B is 5/6, and the score calculated to indicate the relationship between the persons A and C is 4/3. When the number of persons appearing in the same image is taken into account, the relationship between the persons A and C is estimated to be deeper than the relationship between the persons A and B.

FIGS. 17A and 17B are diagrams showing an example of depth-of-relationship values obtained based on the contents of the face information memory unit 520 employed in the second embodiment of the present invention, and an example of priorities determined based on the depth-of-relationship values. FIG. 17A shows as the example of depth-of-relationship values a table 670 of depth-of-relationship values concerning the person A. In the table 670, persons, images, zero-order depth-of-relationship values 671, and first-order depth-of-relationship values 672 are listed in association with one another. The depth-of-relationship values relative to persons listed in the table 670 are calculated by the depth-of-relationship value calculation unit 540. The table 670 shown in FIG. 17A is identical to the table 630 shown in FIG. 15A except a point that, the numerical values calculated for pairs of persons expressed to be linked by straight lines are different. An iterative description will be omitted.

FIG. 17B shows a table 680 of priorities relevant to the person A determined based on the values specified in the table 670 of depth-of-relationship values concerning the person A shown in FIG. 17A. The priorities listed in the table 680 are determined by the priority determination unit 550. The table 680 shown in FIG. 17B is identical to the table 640 shown in FIG. 15B except a point that the zero-order depth-of-relationship values 683 and first-order depth-of-relationship values 684, and the priorities determined based on the zero- and first-order depth-of-relationship values are different. An iterative description will therefore be omitted.

When the table 680 is compared with the table 640 shown in FIG. 15B, although the same images are dealt with, the priorities are different. For example, in the table 640, the first priority is assigned to the person B. In the table 680, the first priority is assigned to the person C. To the person C, the third priority is assigned in the table 640, and the first priority is assigned in the table 680. Specifically, the priorities are determined by putting an emphasis on the relationship between the persons C and A, which appear in the image 602 picked up by photographing a so-called two-shot, other than the relationships of the person A to the three persons (persons B to D) appearing in the image 603 picked up by photographing multiple persons. Similarly to the first embodiment of the present invention, weighting factors to be applied to the zero-order depth-of-relationship values and first-order depth-of-relationship values may be used to calculate depth-of-relationship values, and the priorities may be determined based on the depth-of-relationship values.

[Example in which Priorities are Determined in Consideration of Distances Between Pairs of Persons Appearing in the Same Images]

Figure 18A:
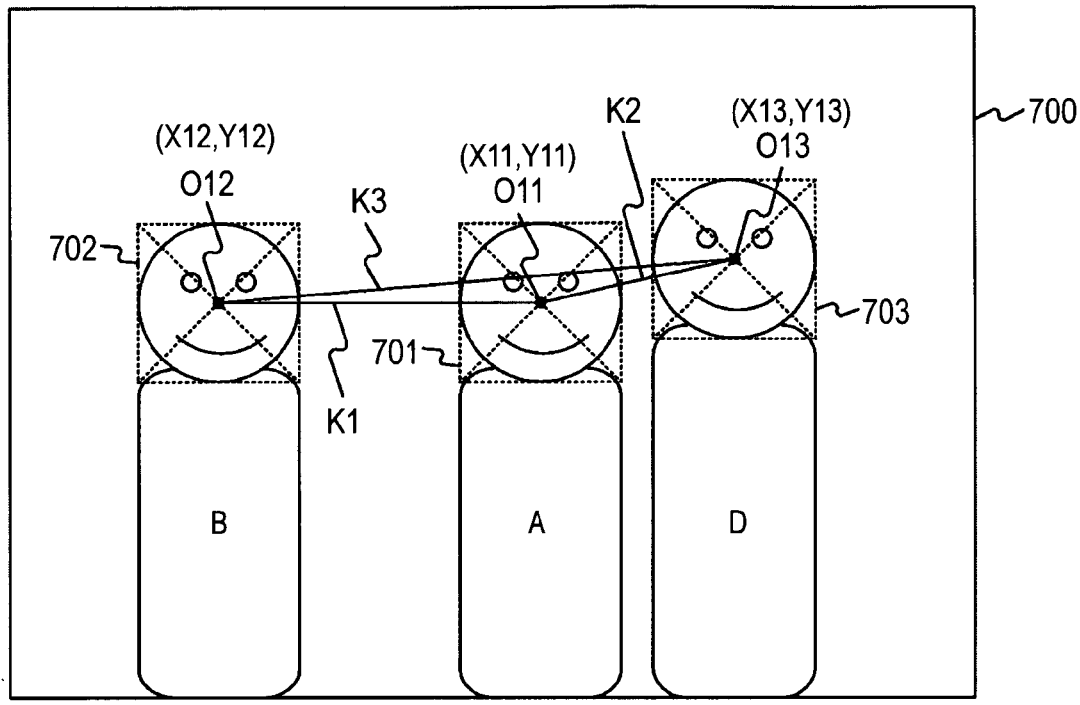
FIGS. 18A and 18B are diagrams illustratively showing images stored in the image memory unit employed in the second embodiment of the present invention.
Figure 18B:
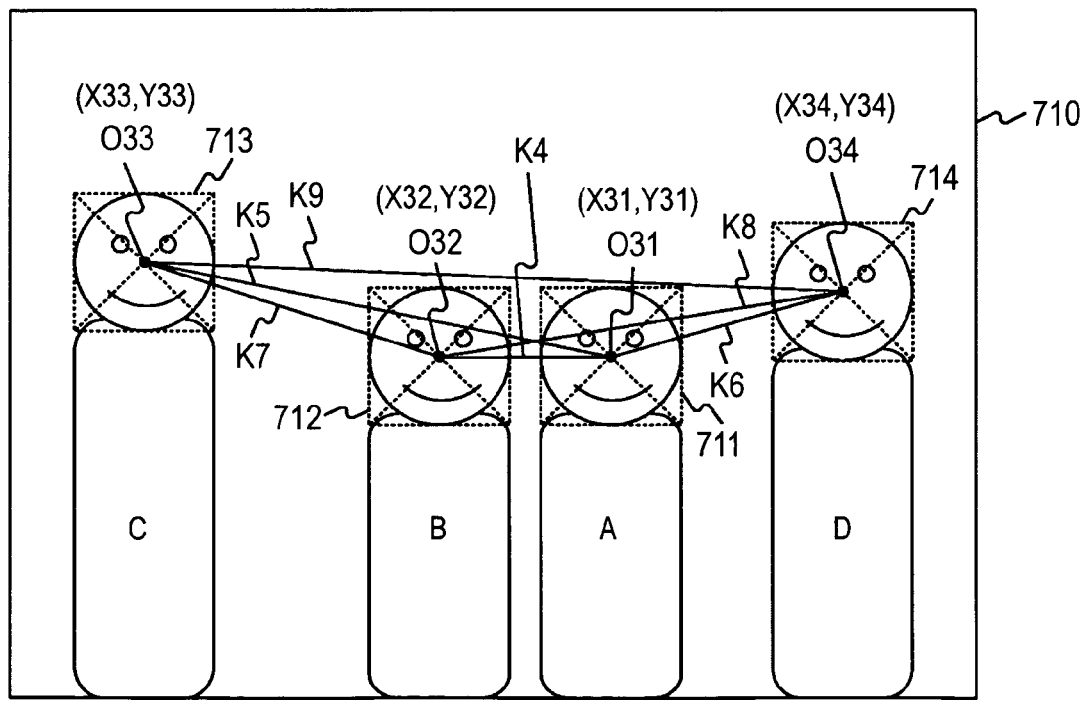

FIGS. 18A and 18B are diagrams illustratively showing images stored in the image memory unit 210 employed in the second embodiment of the present invention. Images 700 and 710 shown in FIGS. 18A and 18B are enlarged ones of the images 601 and 603 shown in FIGS. 12A and 12C. In the face information memory unit 520 shown in FIG. 13, pieces of face-detection information on faces detected by the face detection unit 120 (positions in images of the faces and sizes thereof) are stored. Therefore, the positions of the faces appearing in the images stored in the image memory unit 210, and the sizes thereof can be identified. Using the positions of the faces, the inter-face distance calculation unit 530 calculates the distances between pairs of persons appearing in the images.

For calculating the distances between pairs of persons appearing in the images stored in the image memory unit 210, the inter-face distance calculation unit 530 acquires pieces of face-detection information (positions in the images of the faces) stored in the face information memory unit 520 in association with the pairs of persons appearing in the images. Thereafter, the inter-face distance calculation unit 530 uses the acquired pieces of face-detection information to calculate the distances between the pairs of persons. For example, for calculating the distance between the persons A and B appearing in the image 700 shown in FIG. 18A, the inter-face distance calculation unit 530 acquires pieces of face-detection information, which are stored in association with the image P601 and the persons A and B, from the face information memory unit 520. The pieces of face-detection information refer to the positions in the image of the faces ((X11,Y11) and (X12,Y12)). Thereafter, the inter-face distance calculation unit 530 uses the acquired pieces of face-detection information to calculate the distance between the persons A and B ($\sqrt{(X11-X12)^2+(Y11-Y12)^2}$)). For example, as shown in FIG. 18A, as the distance between the persons A and B, the distance K1 between the center position O11 of the face of the person A and the center position O12 of the face of the person B is calculated. Likewise, as the distance between the persons A and D, the distance K2 between the center position O11 of the face of the person A and the center position O13 of the face of the person D is calculated. As the distance between the persons B and D, the distance K3 between the center position O12 of the face of the person B and the center position O13 of the face of the person D is calculated. In FIG. 18B, the regions of the faces of the persons A to C identified with the pieces of face-detection information stored in the face information memory unit 520 (the positions in the image of the faces and the sizes thereof) are shown as face regions 701 to 703. Likewise, for example, as shown in FIG. 18B, distances K4 to K9 are calculated as the distances between pairs of persons among the persons A to D. In FIG. 18B, the regions of the faces of the persons A to D are shown as face regions 711 to 714. The inter-face distance calculation unit 530 outputs the distances between pairs of persons, which are calculated in units of an image, to the depth-of-relationship calculation unit 540 in association with the pieces of discrimination information on the persons.

FIG. 19 is a diagram showing a human relationship table created based on the contents of the face information memory unit 520 employed in the second embodiment of the present invention. Numerical values (scores) specified in the human relationship table 690 shown in FIG. 19 are calculated by the depth-of-relationship value calculation unit 540. The human relationship table 690 is a table in which the relationships between pairs of persons among the persons A to D appearing in the images 601 to 603 are indicated with the numerical values. FIG. 19 is concerned with a case where multiple persons appear in the same images, and values obtained in consideration of distances between pairs of persons among the multiple persons appearing in the same images are added up. Herein, the distances between pairs of persons among multiple persons appearing in each image are determined based on the relative relationships of a person (reference person) regarded as a reference to the other persons (object persons). Therefore, the human relationship table 690 is, unlike the human relationship tables shown in FIG. 14A and FIG. 16A, a table in which the relationships between the reference persons and object persons are specified.

More particularly, assume that n denotes the numbers of persons appearing in the same images, and m denotes the ranks of the distances between pairs of persons calculated by the inter-face distance calculation unit 530, that is, the distances from reference persons to object persons among the n persons other than the reference persons. In order to calculate a numerical value indicating the relationship between a pair of persons having a distance ranked the m-th, 2(n−m)/(n(n−1)) is calculated as the numerical value indicating the relationship between the pair of persons.

For example, assume that the image 601 in which the three persons A, B, and D appear together is regarded as the same image, a reference person is the person A, and object persons are the persons B and D. In this case, the rank of the distance between the persons A and D calculated by the inter-face distance calculation unit 530 shall be the first rank, and the rank of the distance between the persons A and B shall be the second rank. In this case, ⅓ is calculated as a numerical value indicating the relationship between the reference person A and the object person B. Likewise, ⅔ is calculated as a numerical value indicating the relationship between the reference person A and the object person D. In contrast, for example, the reference person in the image 601 shall be set to the person B, and the object persons shall be set to the persons A and D. In this case, the rank of the distance between the persons A and B calculated by the inter-face distance calculation unit 530 is the first rank, and the rank of the distance between the persons B and D is the second rank. In this case, ⅔ is calculated as a numerical value indicating the relationship between the reference person B and the object person A. Likewise, ⅓ is calculated as a numerical value indicating the relationship between the reference person B and the object person D. Thus, numerical values are sequentially calculated with each of the persons, who appear in the same image, regarded as the reference person. The values calculated from multiple images are added up in relation to each reference person. Thus, values obtained in consideration of distances between pairs of persons appearing in the same images are sequentially added up in order to indicate the relationships between the pairs of persons appearing in the same images. This way, the relationships between the pairs of persons among the persons A to D appearing in the images 601 to 603 are indicated with numerical values.

For example, in the image 601 in which the persons A and B appear together, assuming that the reference person is the person A and the object person is the person B, the numerical value indicating the relationship between the persons A and B is ⅓. In the image 603 in which the persons A and B appear together, assuming that the reference person is the person A and the object person is the person B, the numerical value indicating the relationship between the persons A and B is ½. Eventually, ⅚ is specified in a space in the human relationship table 690 employed in indicating the relationship of the reference person A to the object person B.

For example, when the reference person in the image 603 in which the persons B and C appear together is regarded as the person B, the person C is located at a position farther away from the person B than the person A is. Therefore, the relative relationship of the reference person B to the object person C is estimated to be shallower than the relationship thereof to the person A is. In contrast, when the reference person is set to the person C, the person B is located closer to the person C than the other persons A and D are. Therefore, the relative relationship of the reference person C to the object person B is estimated to be the deepest. Since the relationship is established, for example, when the reference person in the image 603 in which the persons B and C appear together is set to the person B and the object person is set to the person C, the numerical value indicating the relationship between the persons B and C is ⅓. In contrast, when the reference person in the image 603 is set to the person C and the object person is set to the person B, the numerical value indicating the relationship between the persons B and C is ½. The numerical values indicating the relationships between the other pairs of persons are calculated in the same manner, and specified in spaces in the human relationship table 690 employed in indicating the relationships between the pairs of persons.

Figure 20A:
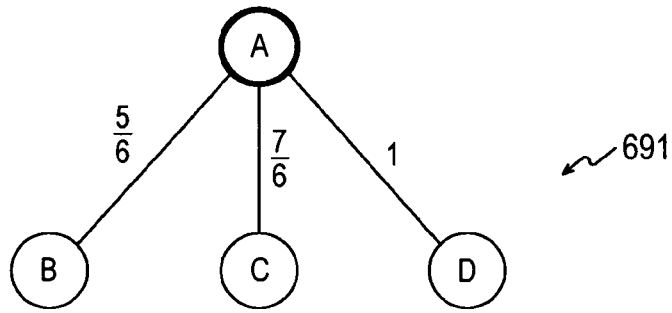
FIGS. 20A to 20D are diagrams showing human relationship charts created based on the contents of the face information memory unit employed in the second embodiment of the present invention.
Figure 20B:
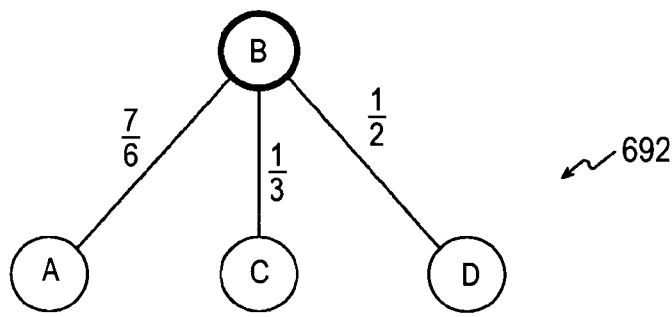
Figure 20C:
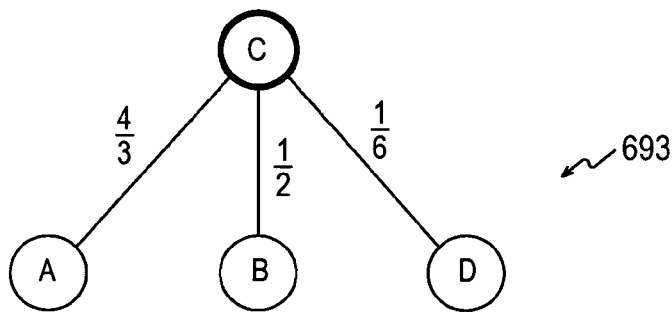
Figure 20D:
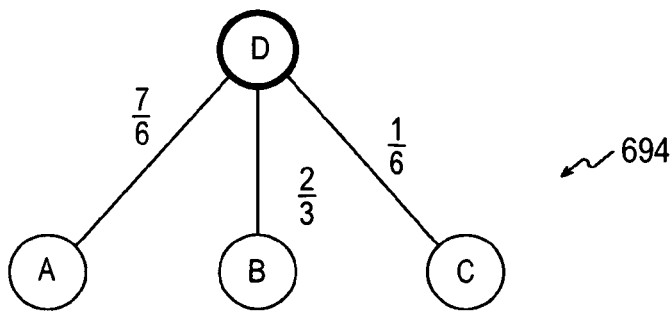

FIGS. 20A to 20D are diagrams showing human relationship charts created based on the contents of the face information memory unit 520 employed in the second embodiment of the present invention. Numerical values (scores) specified in the human relationship charts 691 to 694 shown in FIGS. 20A to 20D are calculated by the depth-of-relationship value calculation unit 540. The human relationship charts 691 to 694 shown in FIGS. 20A to 20D have blank circles, which express the persons A to D, arranged two-dimensionally for the purpose of two-dimensionally expressing the contents of the human relationship table 690 shown in FIG. 19 with respect to each of reference persons. Namely, the human relationship chart 691 shown in FIG. 20A is a human relationship chart concerned with a case where the reference person is the person A and the object persons are the persons B and D. The human relationship chart 692 shown in FIG. 20B is a human relationship chart concerned with a case where the reference person is the person B and the object persons are the persons A, C, and D. The human relationship chart 693 shown in FIG. 20C is a human relationship chart concerned with a case where the reference person is the person C and the object persons are the persons A, B, and D. The human relationship chart 694 shown in FIG. 20D is a human relationship chart concerned with a case where the reference person is the person D and the object persons are the persons A to C. In FIGS. 20A to 20D, the blank circle expressing the reference person is drawn with a bold line. For example, in the human relationship chart 691 shown in FIG. 20A, the reference person A and the object persons B to D are expressed to be linked by straight lines, and scores calculated for the pairs of the reference person A and the object persons B to D (values in the spaces (in the first row) associated with the reference person A in FIG. 19) are appended to the straight lines.

Herein, the distances between pairs of persons among multiple persons appearing in images are determined based on the relative relationships of reference persons to object persons. Therefore, the human relationship charts 691 to 694 are, unlike the human relationship charts shown in FIG. 14B and FIG. 16B, charts expressing the relative relationships of the reference persons to the object persons. For example, in the human relationship chart 691 shown in FIG. 20A, the score calculated for the relationship between the persons A and B is ⅚. In contrast, in the human relationship chart 692 shown in FIG. 20B, the score calculated for the relationship between the persons A and B is ⅞. Thus, when the distances between pairs of persons are taken into consideration, the scores calculated for pairs of persons expressed to be linked by straight lines may become different.

FIGS. 21A and 21B are diagrams showing an example of depth-of-relationship values obtained based on the contents of the face information memory unit 520 employed in the second embodiment of the present invention, and the distances between pairs of persons calculated by the inter-face distance calculation unit 530, and an example of priorities determined based on the depth-of-relationship values. FIG. 21A shows as the example of depth-of-relationship values a table 700 of depth-of-relationship values concerning the person A. In the table 700, persons, images, zero-order depth-of-relationship values 671, and first-order depth-of-relationship values 672 are listed in association with one another. The depth-of-relationship values listed relative to persons in the table 700 are calculated by the depth-of-relationship value calculation unit 540. The table 700 shown in FIG. 21A is substantially identical to the table 630 shown in FIG. 15A except a point that the numerical values calculated for pairs of persons expressed to be linked by straight lines are different. Therefore, the point at which the table 700 is different from the table 630 will be mainly described below. An iterative description will be omitted.

Zero-order depth-of-relationship values 701 are depth-of-relationship values calculated concerning a specific person on the basis of the relationships (direct relationships) of the specific person to other persons who appear together with the specific person in the same images. In the example shown in FIG. 21A, the zero-order depth-of-relationship values calculated based on the direct relationships of the specific person A to the persons B to D are specified. More particularly, the zero-order depth-of-relationship values are the values specified in the row for the person A (first row) in the human relationship table 690 shown in FIG. 19.

The first-order depth-of-relationship values 702 are depth-of-relationship values calculated based on the relationships (indirect relationships) of the specific person to the second person who do not appear together with the specific person in the same images but are related to the specific person via the third person other than the specific person in the multiple images. In the example shown in FIG. 21A, the depth-of-relationship values calculated based on the indirect relationships of the person A to the persons B to D are specified. More particularly, for calculating the first-order depth-of-relationship values for the pairs of the person A and the other person (second person), scores given to the indirect linkages established via the third person other than the person A and the second person are added up. For example, assuming that the persons A and B are indirectly linked via the third person C other than the persons A and B, the persons A and B are, as shown in FIG. 20C or FIG. 20D, linked via the person C or D. When the persons A and B are indirectly linked via the person C, a score given to the persons A and C (⅞ in FIG. 20A), and a score given to the persons C and B (½ in FIG. 20C) are multiplied by each other. Through the multiplication, a product indicating the relationship via the person C is obtained (7/12). Likewise, when the persons A and B are indirectly linked via the person D, a score given to the persons A an D (1 in FIG. 20A) and a score given to the persons D and B (⅔ in FIG. 20D) are multiplied by each other. Through the multiplication, a product indicating the relationship via the person D is obtained (⅔). Thereafter, the product indicating the relationship via the person C (7/12) and the product indicating the relationship via the person D (⅔) are added up. Thus, the first depth-of-relationship value (11/12) for the persons A and B is calculated. The relationships between the other pairs of persons are calculated in the same manner.

FIG. 21B shows a table 710 of priorities relevant to the person A determined based on the values specified in the table 700 of depth-of-relationship values concerning the person A shown in FIG. 21A. The priorities specified in the table 710 are determined by the priority determination unit 550. The table 710 shown in FIG. 21B is identical to the table 640 shown in FIG. 15B except a point that zero-order depth-of-relationship values 713, first-order depth-of-relationship values 714, and the priorities determined based on the zero-order and first-order depth-of-relationship values are different. An iterative description will be omitted.

When the table 710 is compared with each of the table 640 shown in FIG. 15B and the table 680 shown in FIG. 17B, although the same images are dealt with, priorities are different among the tables. For example, in the table 680, the zero-order and first-order depth-of-relationship values associated with the second and third priorities are identical to each other. In the table 710, the zero-order and first-order depth-of-relationship values associated with all priorities are different from one another. For example, in the table 640, the first priority is assigned to the person B. In the tables 680 and 710, the first priority is assigned to the person C. In the table 680, the second priority is assigned to both the persons B and D. In the table 710, the second priority is assigned to the person D, and the third priority is assigned to the person B. Namely, the priorities are determined based not only on the numbers of persons appearing in the same images but also on the distances between pairs of persons. When the depth-of-relationship values are calculated based on the relative positional relationships in the same images, the priorities can be determined in line with user's likes. For example, similarly to the first embodiment of the present invention, weighting factors to be applied to the zero-order depth-of-relationship values and first-order depth-of-relationship values may be used to calculate the depth-of-relationship values, and the priorities may be determined based on the depth-of-relationship values.

Determining priorities on the basis of whether each of pairs of persons is directly or indirectly related to each other, determining priorities in consideration of the numbers of persons, and determining priorities in consideration of the distances between the pairs of persons have been described so far. Whichever of the ways of determining priorities is selected may be designated through manipulative entry at the manipulation recognition unit 190 according to user's likes. The depth-of-relationship values may be calculated, and weighting factors to be applied to the depth-of-relationship values may be used to calculate new depth-of-relationship values. Priorities may then be determined based on the new depth-of-relationship values.

Figure 22A:
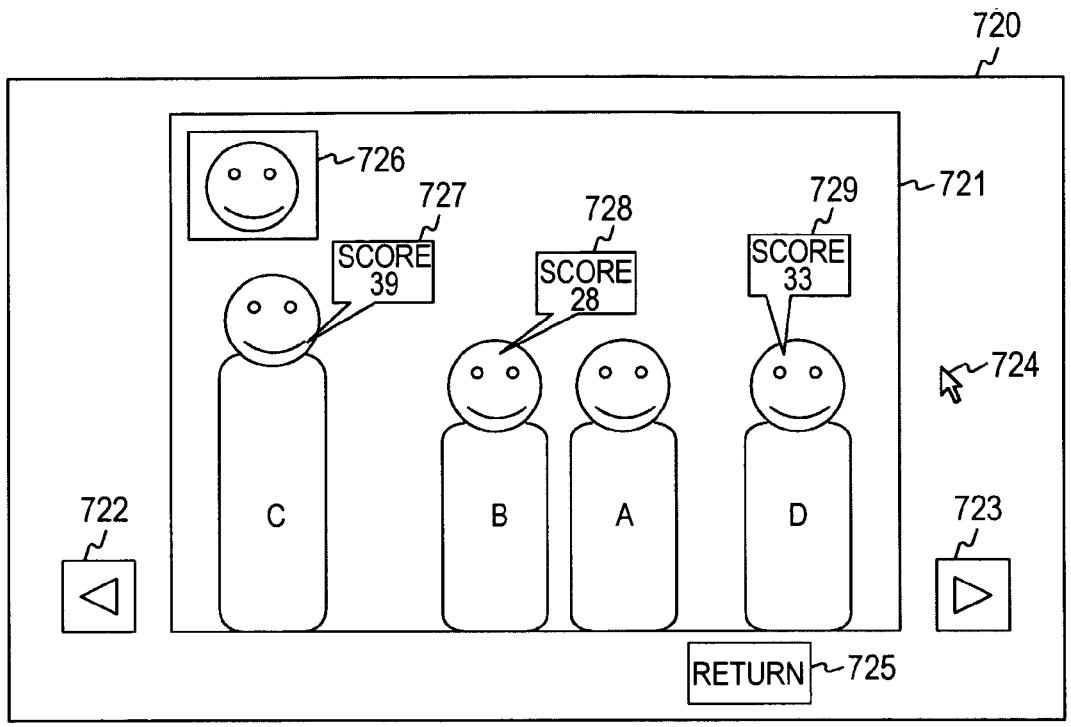
FIGS. 22A and 22B are diagrams showing examples of display screen images displayed on the display unit employed in the second embodiment of the present invention.
Figure 22B:
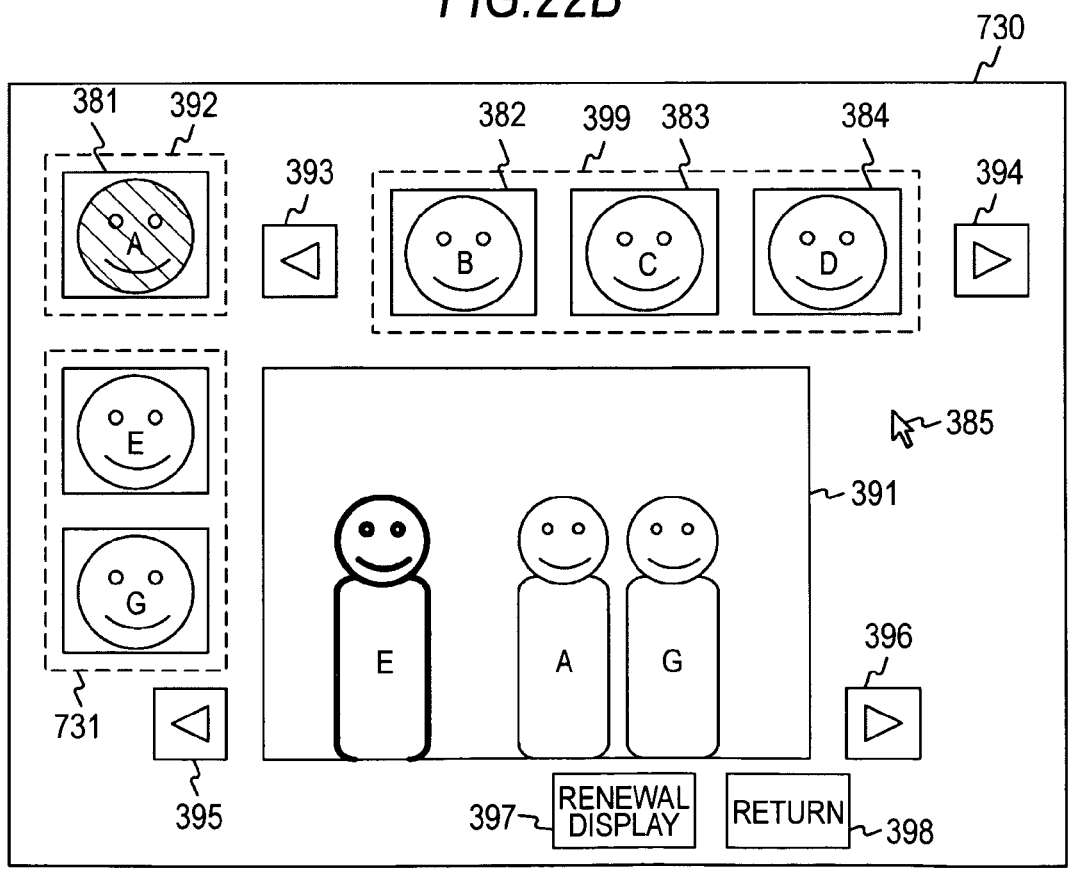

FIGS. 22A and 22B are diagrams showing examples of display screen images displayed on the display unit 180 employed in the second embodiment of the present invention. FIG. 22A shows a display screen image 720 in which images are displayed according to priorities determined with a person of a designated registered face image regarded as a specific person. The display screen image 720 is a screen image to be displayed after a designating manipulation for designating a registered face image is performed through the face image designation screen image 380 shown in FIG. 8A. Namely, the images stored in the image memory unit 210 are displayed in the display screen image 720 according to the priorities relevant to the specific person identified with the registered face image designated through the face image designation screen image 380.

In the display screen image 720, a display field 721 in which the images stored in the image memory unit 210 are displayed, a Left button 722, a Right button 723, and a Return button 725 are contained. The Left button 722, Right button 723, and Return button 725 are identical to the Left button 395, Right button 396, and Return button 398 shown in FIG. 8B. An iterative description will be omitted.

In the display field 721, the images stored in the memory unit 210 are sequentially displayed according to the priorities relevant to the specific person identified with the designated registered face image. In a designated face image field 726 within the display field 721, the designated registered face image (registered face image of the specific person) is displayed. Further, scores 727 to 729 based on depth-of-relationship values calculated for the specific person are appended to persons other than the specific person appearing in the image displayed in the display field 721. In the example shown in FIG. 22A, since the specific person is the person A, the scores 727 to 729 are displayed in association with the persons B to D other than the person A appearing in the image displayed in the display field 721. The scores 727 to 729 are, for example, the percentages of the zero-order depth-of-relationship values, which are calculated relative to the respective persons, to the sum of the zero-order depth-of-relationship values regarded as 100%. For examples, the values written in parentheses adjacently to the zero-order depth-of-relationship values 701 in the table 700 shown in FIG. 21A are displayed as the scores 727 to 729. Alternatively, numerical values relating to the zero-order to i-th-order depth-of-relationship values employed in calculation of priorities (or pieces of display information indicating the numerical values) may be displayed in association with the persons. Thus, how deep the relationship of a specific person to each of persons appearing in a currently displayed image is can be readily grasped based on a numerical value.

FIG. 22B shows a display screen image 730 in which images are displayed according to priorities determined with a person of a designated registered face image regarded as a specific person. The display screen image 730 is a variant of the display screen image 390 shown in FIG. 8B. A difference from the display screen image 390 lies in a point that an appearing face image field 731 in which faces of persons appearing in an image displayed in the display field 391 are displayed is included. The other part of the display screen image is substantially identical to that of the display screen image 390 shown in FIG. 8B. The same reference numerals as those in the display screen image 390 are assigned. The difference will be mainly described below, but an iterative description will be omitted.

In the appearing face image field 731, face images of persons other than a specific person appearing in an image displayed in the display field 391 are displayed. In the example shown in FIG. 22B, the specific person A and other persons E and G appear in the image displayed in the display field 391. Therefore, the face images in which the faces of the persons E and G appear are displayed in the appearing face image field 731. The face images are extracted from the image, which is displayed in the display field 391, using pieces of face-detection information (positions in the image of faces) stored in the face information memory unit 520 in association with the persons E and G, and then displayed. When any of the face images displayed all together in the appearing face image field 731 is newly designated, if a depressing manipulation of depressing the Renewal Display button 397 is performed using the cursor 385, the depth-of-relationship values concerning the specific person identified with the designated face image are calculated. Priorities are determined based on the calculated depth-of-relationship values, and the images stored in the image memory unit 210 are displayed.

As mentioned above, registered face images are displayed all together in the face image field 399, and face images of persons other than a specific person appearing in a currently displayed image are displayed all together in the appearing face image field 731. Therefore, the number of objects of selection from among which a user designates a specific person is increased.

For example, when a slide show of still images is made, a special effect may be applied to faces according to determined priorities so that the faces will appear in close-ups or the like. For example, a special effect may be applied to a face of a person, to which the highest priority is assigned, so that the face will appear the close-up or the like. Alternatively, a special effect may be applied to a pair of persons, which includes a person to whom the highest priority is assigned, so that the pair of persons will be focused on.

[Example of Actions to be Performed in the Image Processing Apparatus]

Next, actions to be performed in the image processing apparatus 500 in accordance with the second embodiment of the present invention will be described with reference to the drawings.

Figure 23:
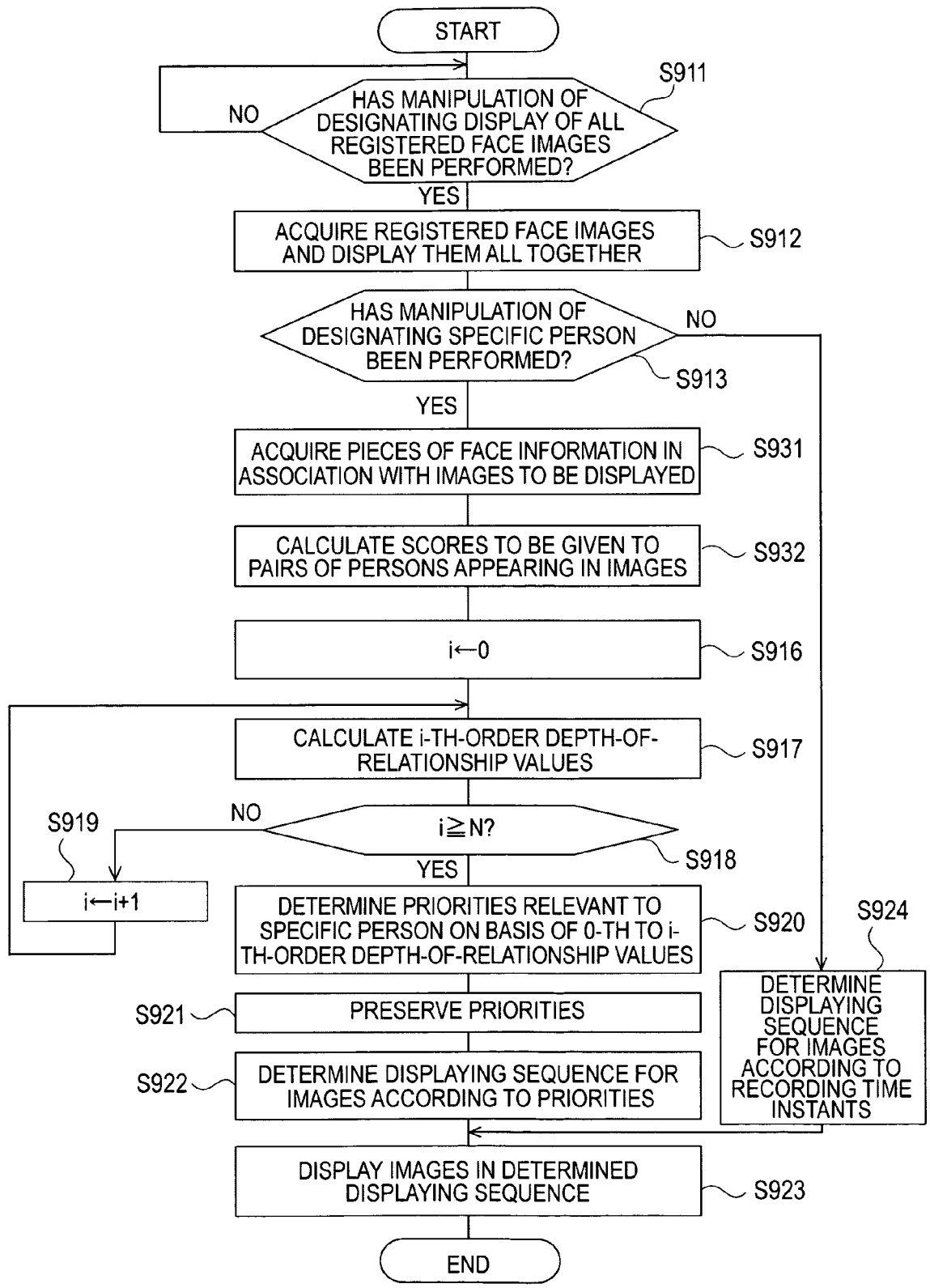
FIG. 23 is a flowchart showing a processing procedure for image displaying processing to be performed in the image processing apparatus in accordance with the second embodiment of the present invention.

FIG. 23 is a flowchart showing a processing procedure for image displaying processing to be performed in the image processing apparatus 500 in accordance with the second embodiment of the present invention. The image displaying processing is a variant of the image displaying processing shown in FIG. 10. The same reference numerals are assigned to pieces of processing identical to those shown in FIG. 10, and an iterative description will be omitted. In the processing procedure, priorities are determined in consideration of the numbers of persons appearing in the same images.

When a designating manipulation performed to designate a registered face image has been recognized (step S913), the depth-of-relationship value calculation unit 540 acquires pieces of face information, which are stored in the face information memory unit 520, in association with images to be displayed (step S931). Thereafter, based on the acquired pieces of face information, the depth-of-relationship value calculation unit 540 calculates scores to be given to pairs of persons appearing in the images to be displayed (step S932). The scores are calculated in consideration of the numbers of persons appearing in the same images.

Figure 24:
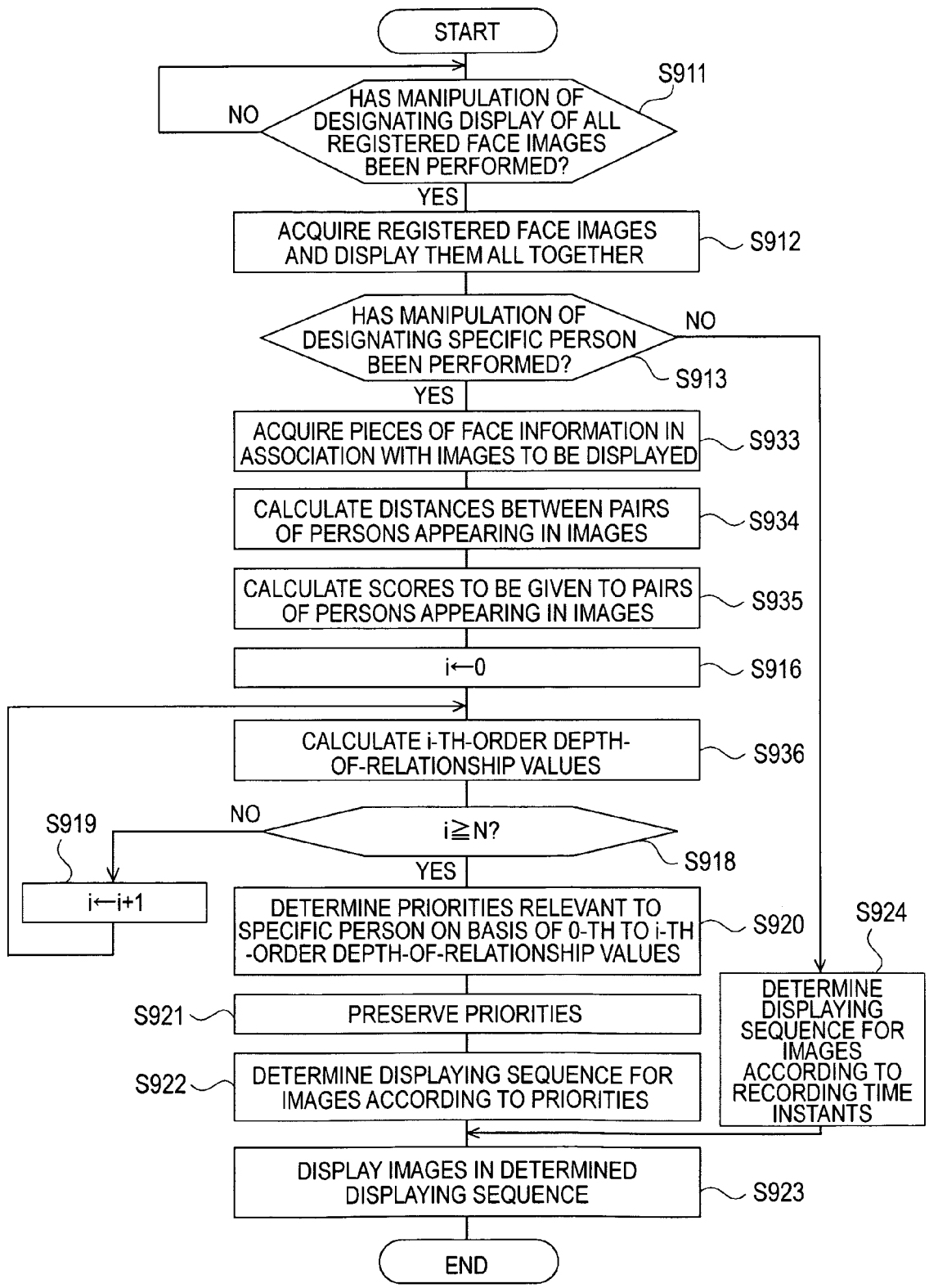
FIG. 24 is a flowchart showing a processing procedure for image displaying processing to be performed in the image processing apparatus in accordance with the second embodiment of the present invention.

FIG. 24 is a flowchart showing a processing procedure for image displaying processing to be performed in the image processing apparatus 500 in accordance with the second embodiment of the present invention. The image displaying processing is a variant of the image displaying processing shown in FIG. 10. The same reference numerals are assigned to pieces of processing identical to those shown in FIG. 10, and an iterative description will be omitted. In the processing procedure, priorities are determined in consideration of the distances between pairs of persons appearing in the same images.

When a designating manipulation performed to designate a registered face image has been recognized (step S913), the inter-face distance calculation unit 530 and depth-of-relationship value calculation unit 540 acquire pieces of face information, which are stored in the face information memory unit 520, in association with images to be displayed (step S933). Thereafter, based on the acquired pieces of face information, the inter-face distance calculation unit 530 calculates the distances between the pairs of persons appearing in the images to be displayed (step S934). Thereafter, based on the acquired pieces of face information and the distances between the pairs of persons calculated by the inter-face distance calculation unit 530, the depth-of-relationship value calculation unit 540 calculates scores to be given to the pairs of persons appearing in the images to be displayed (step S935). The scores are calculated in consideration of the distances between the pairs of persons appearing in the same images. The depth-of-relationship value calculation unit 540 calculates the i-th-order depth-of-relationship values on the basis of the scores given to the pairs including the specific person identified with the designated registered face image (step S936).

<3. Third Embodiment>

[Example of the Configuration of an Image Processing Apparatus]

In the third embodiment of the present invention, an example in which depth-of-relationship values are calculated in consideration of persons appearing in a motion picture will be described with reference to the drawings.

Figure 25:
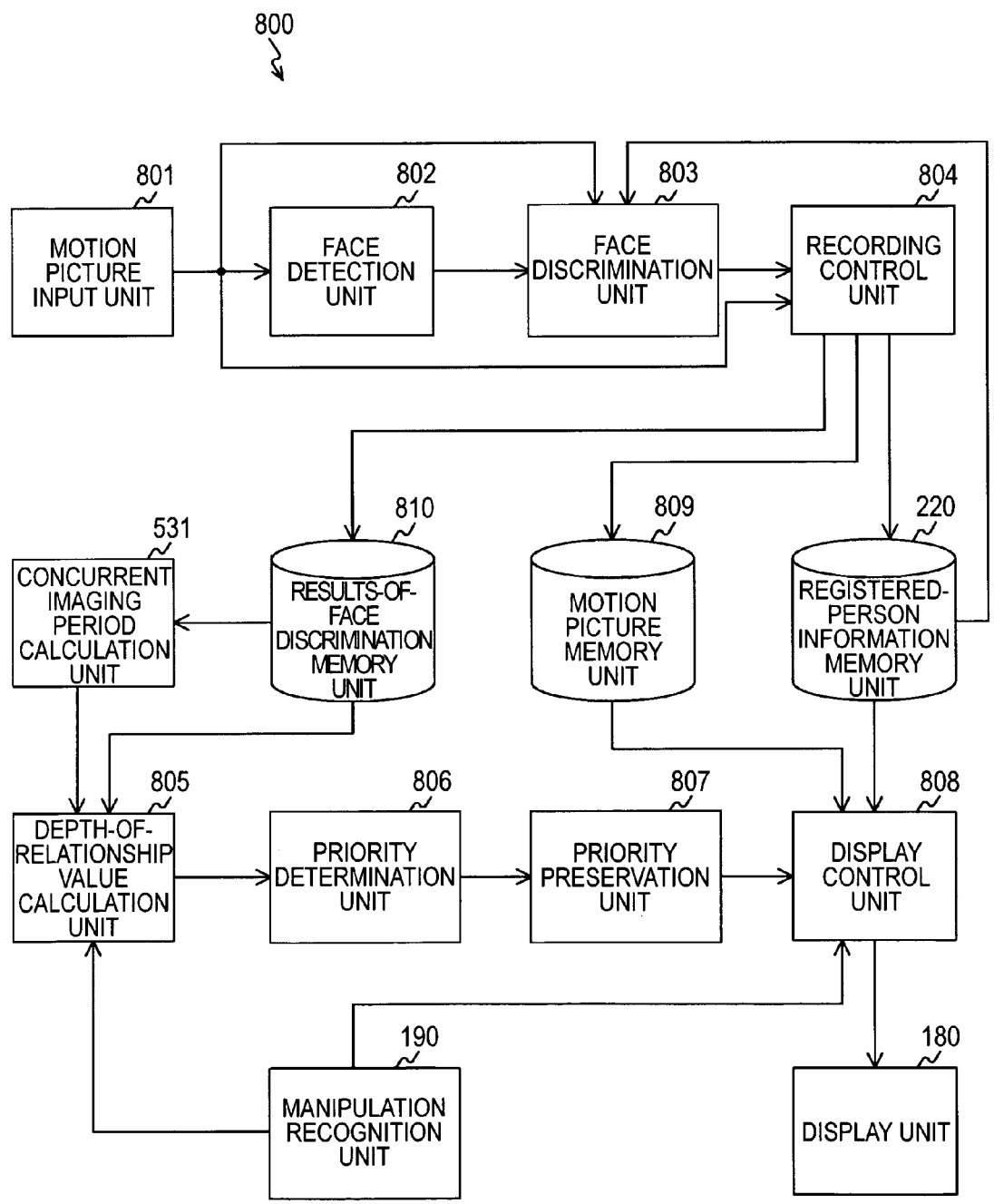
FIG. 25 is a block diagram showing an example of the functional configuration of an image processing apparatus in accordance with a third embodiment of the present invention.

FIG. 25 is a block diagram showing an example of the functional configuration of an image processing apparatus 800 in accordance with the third embodiment of the present invention. The image processing apparatus 800 includes a motion picture input unit 801, a face detection unit 802, a face discrimination unit 803, a recording control unit 804, a depth-of-relationship value calculation unit 805, a priority determination unit 806, and a priority preservation unit 807. The image processing apparatus 800 further includes a display control unit 808, a motion picture memory unit 809, a results-of-face discrimination memory unit 810, and a concurrent imaging period calculation unit 531. The other functional components are substantially identical to those of the image processing apparatus 100 shown in FIG. 1. The same reference numerals are assigned to the components identical to those of the image processing apparatus 100. The components having different functions will be mainly described below, and an iterative description will be omitted. The image processing apparatus 800 is realized by a personal computer capable of extracting feature quantities from a motion picture, which is recorded by an imaging device such as a digital video camera, by performing image analyzing processing, and performing various pieces of image processing using the extracted feature quantities.

The motion picture input unit 801 inputs a motion picture (video data) recorded by an imaging device such as a digital video camera, and outputs the inputted motion picture to the face detection unit 802, face discrimination unit 803, and recording control unit 804.

The face detection unit 802 detects the faces of persons appearing in the motion picture outputted from the motion picture input unit 801, and outputs pieces of face-detection information on the detected faces to the face discrimination unit 803. More particularly, the face detection unit 802 detects the faces of the persons, who appear in images (frames) constituting the motion picture outputted from the motion picture input unit 801, in units of a frame. The face detection unit 802 is substantially identical to the face detection unit 120 shown in FIG. 1 except in a point that the face detection unit 802 detects the faces of persons appearing in a motion picture. An iterative description will be omitted.

The face discrimination unit 803 uses the feature quantities 223 (see FIG. 2), which are stored in the registered-person information memory unit 220, to discriminate the faces detected by the face detection unit 802 from one another so as to judge whether the faces are the faces of the registered persons. The results of face discrimination are outputted to the recording control unit 804 in association with the images (frames) and pieces of face-detection information to be discriminated from one another. The face discrimination unit 803 is substantially identical to the face discrimination unit 130 shown in FIG. 1 except in a point that the face discrimination unit 803 discriminates the faces of persons appearing in a motion picture from one another. An iterative description will be omitted.

The recording control unit 804 controls recordings of data items in the results-of-face discrimination memory unit 810, motion picture memory unit 809, and registered-person information memory unit 220. More particularly, the recording control unit 804 records a motion picture outputted from the motion picture input unit 801 in the motion picture memory unit 809, and records the results of face discrimination, which are outputted from the face discrimination unit 803, in the results-of-face discrimination memory unit 801 in association with the images constituting the motion picture.

In the results-of-face discrimination memory unit 810, the results of face discrimination outputted from the face discrimination unit 803 are stored in association with the images to be discriminated from one another under the control of the recording control unit 804. The stored results of face discrimination are fed to the concurrent imaging period calculation unit 531 and depth-of-relationship value calculation unit 805. The results-of-face discrimination memory unit 810 will be detailed later with reference to FIGS. 26A and 26B.

In the motion picture memory unit 809, the motion picture outputted from the motion picture input unit 801 is stored under the control of the recording control unit 804, and the stored motion picture is fed to the display control unit 808.

Based on the results of face discrimination stored in the results-of-face discrimination memory unit 810, the concurrent imaging period calculation unit 531 calculates a period during which the faces of pairs of persons among persons appearing in the motion picture, which is stored in the motion picture memory unit 809, appear together in the same frames. The calculated periods are outputted to the depth-of-relationship value calculation unit 805 in association with intervals of the motion picture used for calculations and pieces of registered-person information. The concurrent imaging period calculation unit 531 calculates a period, during which the face of a reference person and the face of another person appear together in the same frames within the same chapter included in the motion picture, in relation to each of other persons. The calculation of the period will be detailed later with reference to FIGS. 26A and 26B.

The depth-of-relationship value calculation unit 805 calculates depth-of-relationship values on the basis of the results of face discrimination stored in the results-of-face discrimination memory unit 810, and outputs the calculated depth-of-relationship values to the priority determination unit 806. More particularly, the depth-of-relationship value calculation unit 805 calculates scores, which are given to pairs of persons, on the basis of the appearance frequencies by which the pairs of persons out of the persons appearing in the motion picture stored in the motion picture memory unit 809 appear within predetermined intervals, and the periods during which the pairs of persons appear in the same frames within the predetermined intervals. The zero-order depth-of-relationship values relative to the second person are calculated based on the scores given to the pairs of a specific person and the second person. The first-order depth-of-relationship values relative to the second person are calculated based on the scores given to the pairs of the specific person and the third person, and the scores given to the pairs of the second person and the third person. The calculation of the depth-of-relationship values will be detailed later with reference to FIGS. 26A and 26B.

The priority determination unit 806 determines priorities to be assigned to multiple persons, who have pieces of registered-person information thereon stored in the registered-person information memory unit 220, on the basis of the depth-of-relationship values outputted from the depth-of-relationship value calculation unit 805. The determined priorities are outputted to and preserved in a priority preservation unit 807.

The priority preservation unit 807 preserves the priorities outputted from the priority determination unit 806, and feeds the preserved priorities to the display control unit 808.

Based on the contents of a manipulation recognized by the manipulation recognition unit 190, the display control unit 808 displays each of the motion pictures, which are stored in the motion picture memory unit 809, on the display unit 180. For example, when a designating manipulation performed to designate one registered face image from among the registered face images displayed all together on the display unit 180 has been recognized by the manipulation recognition unit 190, the display control unit 808 acquires the priorities preserved in the priority preservation unit 807. The display control unit 808 then acquires one motion picture or multiple motion pictures stored in the motion picture memory unit 809, and sequentially reproduces the motion pictures on the display unit 180 according to the priorities acquired from the priority preservation unit 807. The motion picture reproduction based on the priorities may be performed in units of, for example, a motion picture or a chapter. Representative images of motion pictures or chapters may be sequentially displayed according to priorities, and motion picture reproduction may be initiated responsively to selection of any of the representative images.

[Example of Determination of Priorities]

Figure 26:
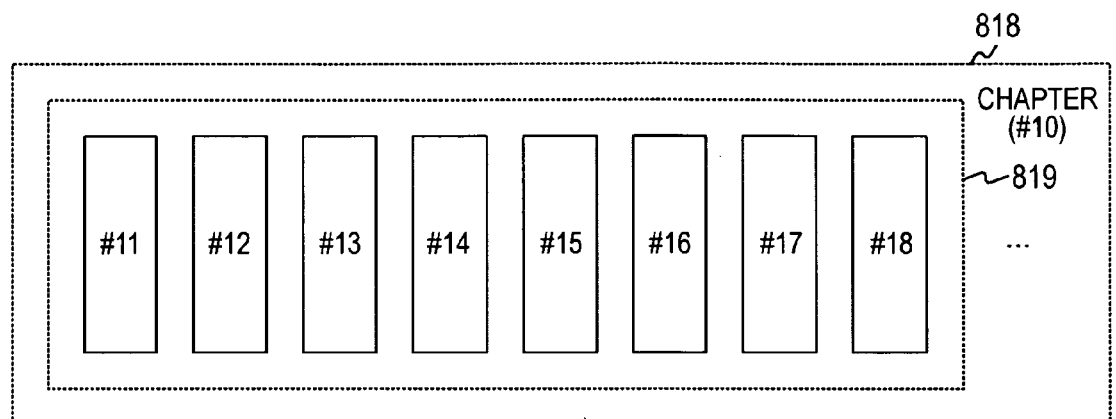
FIGS. 26A and 26B are diagrams schematically showing the relationship between a motion picture stored in a motion picture memory unit employed in the third embodiment of the present invention, and the contents of a results-of-face discrimination memory unit.

FIGS. 26A and 26B are diagrams schematically showing the relationship between a motion picture, which is stored in the motion picture memory unit 809 employed in the third embodiment of the present invention, and the contents of the results-of-face discrimination memory unit 810. FIG. 26A schematically shows a motion picture (#1) 818 stored in the motion picture memory unit 809. Herein, the leading chapter among chapters (so-called segments of a motion picture) constituting the motion picture (#1) 818 stored in the motion picture memory unit 809 is shown in as a chapter (#10) 819. The chapter (#10) 819 shall include frames #11 to #18.

FIG. 26B shows the results-of-face discrimination memory unit 810 in which the relationships between images, which constitute the motion picture inputted by the motion picture input unit 801, and detected persons appearing in the images are recorded as the results of face discrimination. In the example shown in FIG. 26B, the contents of the results-of-face discrimination memory unit signify that pieces of registered-person information for use in discriminating the persons A to D from one another are stored in the registered-person information memory unit 220.

In the results-of-face discrimination memory unit 810, motion picture IDs 811, chapter numbers 812, frame numbers 813, and persons 814 to 817 are stored in association with one another.

The motion picture IDs 811 are pieces of discrimination information for use in discriminating motion pictures, which are stored in the motion picture memory unit 809, from one another. For example, #1, #2, etc. are assigned to the motion pictures in the order in which the motion pictures are stored, and then stored.

The chapter numbers 812 are pieces of discrimination information for use in discriminating chapters, which constitute each of the motion pictures stored in the motion picture memory unit 809, from one another. For example, #10 is assigned to the leading chapter (#10) 819 included in the motion picture having the motion picture ID 811 of #1, and then stored.

The frame numbers 813 are pieces of discrimination information for use in discriminating frames, which constitutes each of the motion pictures stored in the motion picture memory unit 809, from one another. For example, #11 to #18 are assigned to the frames constituting the motion picture having the motion picture ID 811 of #1, and then stored.

The registered persons 814 to 816 are pieces of discrimination information representing persons who have pieces of registered-person information thereon stored in the registered-person memory unit 220. In the example shown in FIG. 26B, the pieces of discrimination information representing the persons A to D are shown as A to D.

In the example shown in FIG. 26B, when the faces of registered persons are detected in the motion picture (#1) 818, a circle is specified in the columns for the persons in association with frames in which the faces are detected. When the faces of registered persons are not detected, a hyphen is specified in the columns for the persons. For example, since the person D appears in the frame #11, the circle is specified in the column for D in association with the frame number 813 of #11, and the hyphen is specified in the columns for A, B, and C in association therewith. As for the frame #14 in which the persons A, B, and D appear, the circle is specified in the columns for A, B, and D in association with the frame number 813 of #14, and the hyphen is specified in the column for C. A variance in persons, who appear in each frame, between adjoining frames is thought to be limited. For a better understanding, the example shown in FIG. 26B will be described by taking for instance a case in which the variance is large.

In the results-of-face discrimination memory unit 810, the results of face discrimination performed on registered persons detected in images are stored in association with the images constituting each of the motion pictures inputted by the motion picture input unit 801. The results of face discrimination stored in the results-of-face discrimination memory unit 810 are used to calculate depth-of-relationship values.

For producing a motion picture, while an imaging range of an imaging device is shifted in a horizontal direction or the like, recording is presumably performed. Therefore, even when multiple persons exist in the same space, there may be an interval within which the persons existing in the same space may not appear together in the same frame. Even when there is an interval within which the persons do not appear together in the same frame, the persons appearing in any of frames within a certain interval are thought to be deeply related to one another. For example, the persons A, B, and D appearing in any of the frames #11 to #18 constituting the chapter of the chapter number 812 of #10 shall have direct relationships, which have been described in relation to the first embodiment of the present invention, to one another. The person C who does not appear in any of the frames #11 to #18 shall not have a direct relationship to each of the persons A, B, and D. Similarly to the first embodiment of the present invention, scores are calculated for each picture on the basis of direct relationships established in units of a certain interval (for example, a chapter) in place of direct relationships established in units of a still image. Based on the calculated scores, the zero-order to i-th-order depth-of-relationship values are calculated in the same manner as they are in the first embodiment of the present invention. Specifically, in the case of a motion picture, the depth-of-relationship values are calculated based on the direct relationships established in units of multiple frames, which occupy a certain interval, in place of the direct relationships established in units of a frame.

However, for example, as described in relation to the second embodiment of the present invention, persons having a deep human relationship are thought to exist mutually closely in the same space. For example, persons having a deep human relationship and existing at a short distance from each other are thought to appear together in many frames out of the frames constituting the same chapter (the time during which the persons appear in the same frames is long). Therefore, an example in which depth-of-relationship values are calculated in consideration of periods during which pairs of persons appear together in the same frames out of the frames occupying the same interval will be described below.

In the results-of-face discrimination memory unit 810 shown in FIG. 26B, the results of face discrimination performed on faces detected by the face detection unit 802 are stored. The faces appearing in each of the motion pictures stored in the motion picture memory unit 809 can be identified in units of a frame. The concurrent imaging period calculation unit 531 uses the results of face discrimination, which are stored in the results-of-face discrimination memory unit 810, to calculate periods (concurrent imaging intervals), during which pairs of persons appear in the same frames, in units of a chapter. Namely, the concurrent imaging period calculation unit 531 sequentially calculates the concurrent imaging intervals for the pairs of persons appearing in the same chapter.

For example, when the concurrent imaging interval within the chapter identified with the chapter number 812 of #10 during which the persons A and B appear together is calculated, the concurrent imaging period calculation unit 531 acquires the results of face discrimination performed for the frames #11 to #18 constituting the chapter of the chapter number 812 of #10. Thereafter, the concurrent imaging period calculation unit 531 uses the acquired results of face discrimination to calculate the period during which the persons A and B appear in the same frames. As shown in FIG. 26B, the period during which the persons A and B appear in the same frames is a period occupied by the frames #14 and #15. The two frames are obtained as the concurrent imaging interval within the chapter of the chapter number 812 of #10 in relation to the persons A and B. The concurrent imaging period calculation unit 531 outputs the calculated concurrent imaging intervals relevant to pairs of persons to the depth-of-relationship value calculation unit 805 in association with the pieces of discrimination information on the persons and the chapter numbers.

Thereafter, the depth-of-relationship value calculation unit 805 calculates depth-of-relationship values according to the lengths of the concurrent imaging intervals. The depth-of-relationship values are calculated in the same manner as the depth-of-relationship values are calculated in consideration of the distances between pairs of persons in the second embodiment of the present invention. For example, n denotes the numbers of persons appearing in the same chapters, and m denotes ranks assigned to the lengths of the concurrent imaging intervals relevant to pairs of a reference person and other persons, who are included in persons (object persons) other than the reference person among the n persons, calculated by the concurrent imaging period calculation unit 531. In order to calculate a numerical value indicating the relationship between a pair of persons relevant to which the concurrent imaging interval ranks m, $2(n-m)/(n(n-1))$ is calculated as the numerical value indicating the relationship between the pair of persons.

As mentioned above, numerical values are calculated with each of persons, who appear in the same chapter, regarded as a reference person, the numerical values obtained for multiple chapters are added up in units of the reference person. Thus, the values calculated in consideration of the distances between pairs of persons appearing in the same chapters in order to indicate the relationships between the pairs of persons appearing in the same chapters are added up. Eventually, the relationships between the pairs of persons among the persons A to D appearing in the motion picture (#1) 818 can be indicated with the numerical values (scores). The numerical values may be calculated in the same manner with respect to multiple motion pictures.

[Example of Actions to be Performed in the Image Processing Apparatus]

Next, actions to be performed in the image processing apparatus 800 in accordance with the third embodiment of the present invention will be described with reference to the drawings.

Figure 27:
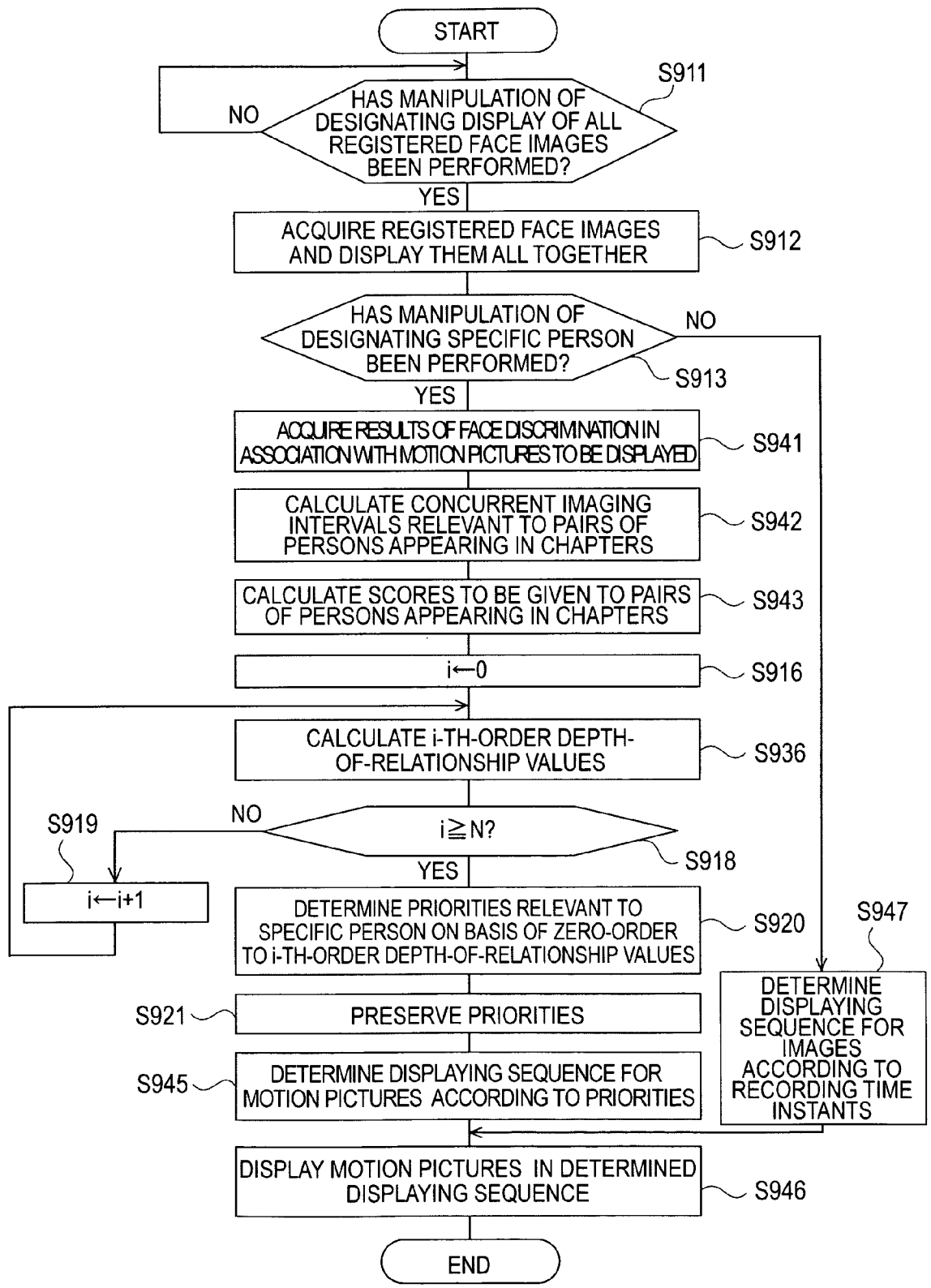
FIG. 27 is a flowchart showing a processing procedure for image displaying processing to be performed in the image processing apparatus in accordance with the third embodiment of the present invention.

FIG. 27 is a flowchart showing a processing procedure for image displaying processing to be performed in the image processing apparatus 800 in accordance with the third embodiment of the present invention. The image displaying processing is a variant of image displaying processing shown in FIG. 24. The same reference numerals are assigned to pieces of processing identical to those shown in FIG. 24. An iterative description will be omitted. The processing procedure is concerned with a case where priorities are determined in consideration of the concurrent imaging intervals relevant to pairs of persons appearing in the same chapters.

When a designating manipulation of designating a registered face image has been recognized (step S913), the concurrent imaging period calculation unit 531 and depth-of-relationship value calculation unit 805 acquire the results of face discrimination, which are stored in the results-of-face discrimination memory unit 810, in association with each of motion pictures to be displayed (step S941). Thereafter, based on the acquired results of face discrimination, the concurrent imaging period calculation unit 531 calculates the concurrent imaging intervals relevant to pairs of persons appearing in chapters (step S942). Thereafter, the depth-of-relationship value calculation unit 805 calculates scores, which are given to the pairs of persons appearing in each of the motion pictures to be displayed, on the basis of the acquired results of face discrimination and the concurrent imaging intervals relevant to the pairs of persons calculated by the concurrent imaging period calculation unit 531 (step S943). The scores are calculated in consideration of the concurrent imaging intervals relevant to the pairs of persons appearing in the same chapters.

Based on the priorities preserved in the priority preservation unit 807, the display control unit 808 determines a displaying sequence of motion pictures to be displayed (step S945). Thereafter, the display control unit 808 displays on the display unit 180 the motion pictures to be displayed according to the determined displaying sequence (step S946).

When a designating manipulation performed to designate a registered face image has not been recognized (step S913), the display control unit 170 determines a displaying sequence for motion pictures to be displayed according to the recording time instants of the motion pictures to be displayed (step S947).

<4. Fourth Embodiment>

[Example of the Functional Configuration of an Imaging Device]

In the first to third embodiments of the present invention, a description has been made of a case where display of contents is controlled using priorities calculated based on depth-of-relationship values. In the fourth embodiment, a description will be made of a case where imaging is controlled using the priorities calculated based on the depth-of-relationship values.

Figure 28:
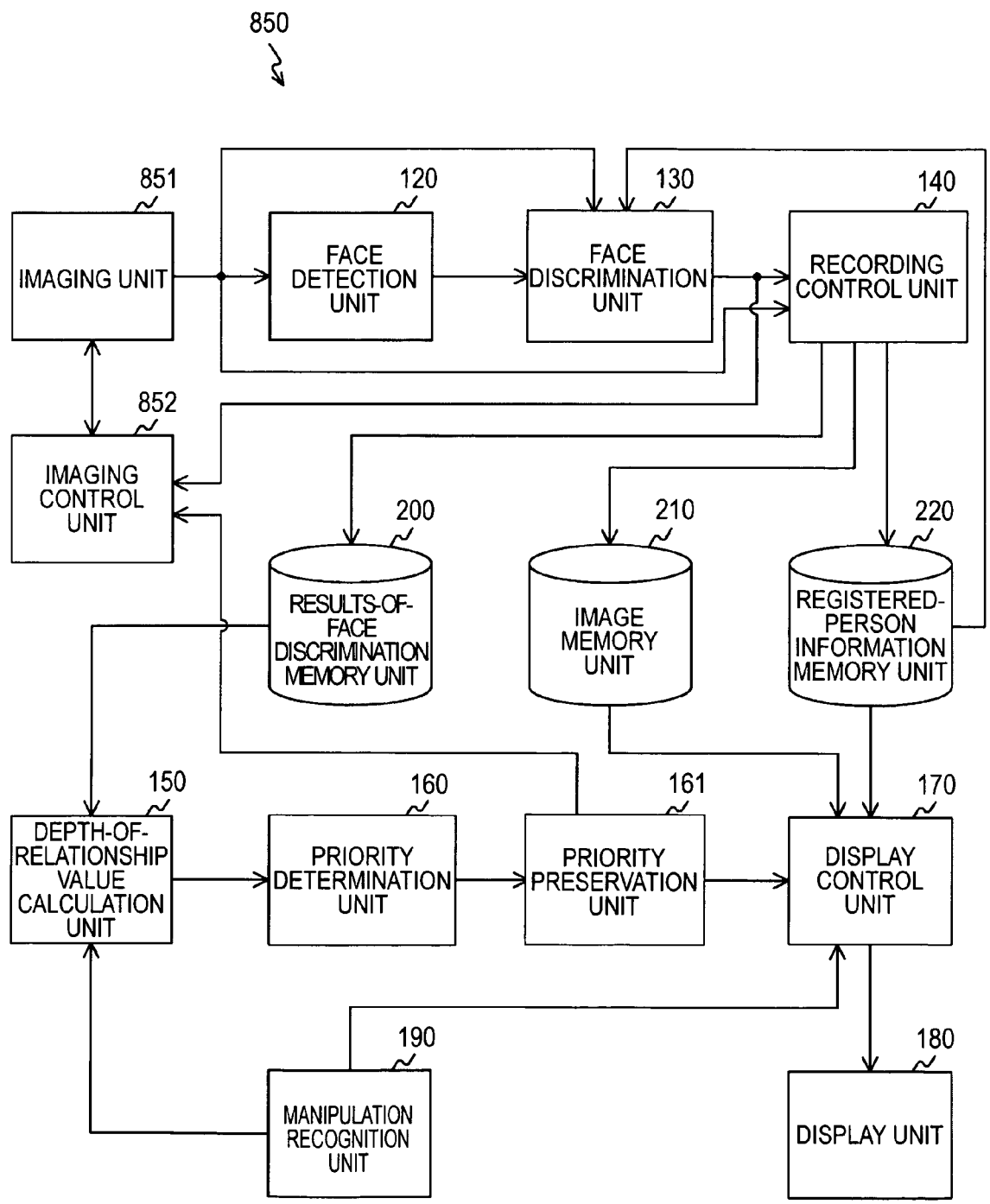
FIG. 28 is a block diagram showing the functional configuration of an imaging device in accordance with a fourth embodiment of the present invention.

FIG. 28 is a block diagram showing an example of the functional configuration of an imaging device 850 in accordance with the fourth embodiment of the present invention. The imaging device 850 is a partial variant of the image processing apparatus 100 in accordance with the first embodiment of the present invention, and substitutes an imaging unit 851 and an imaging control unit 852 for the image input unit 110. The constitution of the imaging device 850 is identical to that of the image processing apparatus 100 except a point that priorities preserved in the priority preservation unit 161 are used to control imaging to be performed by the imaging unit 851. Therefore, the same reference numerals are assigned to the functional components identical to those of the image processing apparatus 100. An iterative description will be omitted. The imaging device 850 includes the imaging unit 851 and imaging control unit 852. The imaging device 850 is realized with an imaging device such as a digital still camera or a digital video camera capable of imaging subjects and producing contents such as pickup images.

The imaging unit 851 includes an image sensor (not shown) and a signal processing block (not shown) that processes an output signal of the image sensor and produces pickup images (image data items). Specifically, in the imaging unit 851, an optical image of a subject coming through a lens (not shown) is formed on the imaging surface of the image sensor. In this state, the image sensor performs an imaging action and the signal processing block performs signal processing on a pickup signal. Eventually, the pickup image is produced. Camera parameters (imaging parameters) employed in production of pickup images are determined by the imaging control unit 852. The produced pickup image is outputted to each of the face detection unit 120, face discrimination unit 130, recording control unit 140, and imaging control unit 852.

The imaging control unit 852 sequentially assesses pickup images produced by the imaging unit 851, determines camera parameters including a shutter speed, an exposure value, and a white balance setting, and controls the imaging unit 851 using the determined camera parameters. Based on priorities preserved in the priority preservation unit 161, the imaging control unit 852 determines the camera parameters. For example, when multiple faces appear in pickup images produced by the imaging unit 851, the camera parameters are determined optimally to the face, to which the highest priority is assigned, among the faces. In this case, the face to which the highest priority is assigned and which appear in the pickup image is identified based on the results of face discrimination and pieces of face-detection information outputted from the face discrimination unit 130.

For example, an owner of the imaging device 850 is designated as a specific person. When the owner records multiple persons using the imaging device 850, the imaging parameters may be determined based on the human relationships between pairs of persons appearing in previously recorded images, so that persons having deep relationships to the owner will appear clearly. For example, imaging is controlled with the face, to which the highest priority among the priorities preserved in the priority preservation unit 161 is assigned, regarded as a reference. For example, the position of the face of the person to whom the highest priority is assigned and who appears in a pickup image is regarded as an AF area (a range-finding area), and automatic focus control is implemented. The white balance setting, color balance setting, exposure value, and others are automatically controlled so that the shooting conditions will be optimal to the face of the person to whom the highest priority is assigned.

When pickup images are displayed in a monitoring mode, the display may be controlled based on the priorities preserved in the priority preservation unit 161. For example, as shown in FIG. 22A, scores derived from depth-of-relationship values calculated for a specific person may be displayed in association with persons appearing in the pickup images. Thus, persons close to a shooting person can be clearly imaged according to priority. A person who should be regarded as a reference during shooting can be readily recognized.

In the fourth embodiment of the present invention, imaging is controlled according to priorities determined, as described in relation to the first embodiment of the present invention, based on whether pairs of persons are directly or indirectly related to each other. Alternatively, imaging may be controlled according to priorities determined, as described in the second and third embodiments, in consideration of the numbers of persons, in consideration of the distances between pairs of persons, or in consideration of the lengths of concurrent imaging intervals. Whichever of the sets of priorities will be used may be selected according to, for example, user's likes through manipulative entry made at the manipulation recognition unit 190. Depth-of-relationship values may be calculated, and weighting factors to be applied to the depth-of-relationship values may be used to calculate new depth-of-relationship values. Priorities determined based on the new depth-of-relationship values may be employed.

In the embodiments of the present invention, persons appearing in contents are discriminated from one another by the face discrimination unit, and then identified. Metadata items embedded in images produced by another apparatus may be used to discriminate persons from one another.

As described so far, according to the embodiments of the present invention, priorities can be determined in consideration of the direct or indirect relationships of a specific person, who appears in contents, to the other persons. Specifically, there is a high possibility that persons appearing in the same content may have a deep relationship, and that persons having deep relationships to a common person may have a deep relationship. Using this fact, priorities may be determined. Therefore, for example, when persons who appear in images in which the specific person does not appear are estimated to have deep indirect relationships, there is a possibility that the specific person may be displayed according to priority. Therefore, the deep relationship of the specific person to an unexpected person may be discovered. When indirect human relationships are taken into account, friendships of the specific person to friends or interesting images in which the friends appear but the specific person does not appear may be discovered. In addition, the contents can be sorted using the priorities. Accordingly, sorting the contents from a different viewpoint can be achieved readily. When pieces of information corresponding to depth-of-relationship values relative to persons are displayed, the human relationships between pairs of persons appearing in contents can be readily grasped. Namely, the degrees of depth of the relationships between pairs of persons which are ambiguous and hard to assess quantitatively can be indicated with numerical values or the like. Thus, outputs of contents in which persons meeting the owner's likes appear or outputs of contents in which persons concerned with the owner or the like are focused on can be constructed.

The embodiments of the present invention are mere example in which the present invention is implemented, and correspond to the matters that are necessary to define the invention and set forth in Claims. However, the present invention is not limited to the embodiments, but can be varied in various manners without a departure from the scope of the invention.

The processing procedures described in the embodiments of the present invention may be recognized as methods including the procedures, as programs causing a computer to execute the procedures, or as recording media in which the programs are stored. As the recording media, for example, a compact disk (CD), a mini disc (MD), a digital versatile disk (DVD), a memory card, or a Blu-ray disc (registered trademark) may be adopted.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a depth-of-relationship value calculation unit that regards a person, who appears in any of a plurality of contents, as a specific person, and calculates a depth-of-relationship value, which indicates the degree of depth of the relationship between the specific person and a second person, on the basis of an appearance frequency of the second person or a third person other than the second person in contents in which the specific person appears, and on the basis of the appearance frequencies of the second person and the third person in contents in which the specific person does not appear, wherein the depth-of-relationship value calculation unit calculates scores to be given to pairs of persons, who appear in the plurality of contents, on the basis of the appearance frequencies of the pairs of persons, who appear together in the same contents, among the persons appearing in the plurality of contents, the depth-of-relationship value calculation calculating the depth-of-relationship value on the basis of: the score given to the pair of the specific person and the second person, the score given to the pair of the specific person and the third person, and the score given to the pair of the second person and the third person; and
a priority determination unit that determines a priority, which is assigned to the second person relating to the specific person among the persons appearing in the plurality of contents, on the basis of the calculated depth-of-relationship value.

2. The image processing apparatus according to claim 1, wherein
the depth-of-relationship value calculation unit calculates a first depth-of-relationship value on the basis of the score given to the pair of the specific person and the second person, and calculates a second depth-of-relationship value on the basis of the score given to the pair of the third person and the specific person and the score given to the pair of the second person and the third person; and
the priority determination unit determines the priority on the basis of the calculated first depth-of-relationship value and second depth-of-relationship value.

3. The image processing apparatus according to claim 2, wherein the priority determination unit calculates the depth-of-relationship value on the basis of values obtained by weighting the calculated first depth-of-relationship value and second depth-of-relationship value.

4. The image processing apparatus according to claim 1, further comprising an output control unit that controls output of the plurality of contents according to the determined priority.

5. An image processing apparatus comprising:
a depth-of-relationship value calculation unit that regards a person, who appears in any of a plurality of contents, as a specific person, and calculates a depth-of-relationship value, which indicates the degree of depth of the relationship between the specific person and a second person, on the basis of an appearance frequency of the second person or a third person other than the second person in contents in which the specific person appears, and on the basis of the appearance frequencies of the second person and the third person in contents in which the specific person does not appear, wherein the depth-of-relationship value calculation unit calculates scores, which are given to pairs of persons appearing in the plurality of contents, on the basis of appearance frequencies of the pairs of persons, who appear together in the same contents, among the persons appearing in the plurality of contents, and the numbers of the persons who appear together in the same contents, the depth-of-relationship value calculation unit calculating the depth-of-relationship value on the basis of: the score given to the pair of the specific person and the second person, the score given to the pair of the specific person and the third person, and the score given to the pair of the second person and the third person; and
a priority determination unit that determines a priority, which is assigned to the second person relating to the specific person among the persons appearing in the plurality of contents, on the basis of the calculated depth-of-relationship value.

6. An image processing apparatus comprising:
a depth-of-relationship value calculation unit that regards a person, who appears in any of a plurality of contents, as a specific person, and calculates a depth-of-relationship value, which indicates the degree of depth of the relationship between the specific person and a second person, on the basis of an appearance frequency of the second person or a third person other than the second person in contents in which the specific person appears, and on the basis of the appearance frequencies of the second person and the third person in contents in which the specific person does not appear,
wherein the content includes a plurality of frames occupying a predetermined interval included in a motion picture
wherein the depth-of-relationship value calculation unit calculates the scores to be given to pairs of persons, who appear in the motion picture, on the basis of the appearance frequencies of the pairs of persons, who appear within the same intervals, among the persons appearing in the motion picture, and the periods during which the pairs of persons appear in the same frames within the same intervals, and
wherein the depth-of-relationship value calculation unit calculates the depth-of-relationship value on the basis of: the score given to the pair of the specific person and the second person, the score given to the pair of the specific person and the third person, and the score given to the pair of the second person and the third person; and
a priority determination unit that determines a priority, which is assigned to the second person relating to the specific person among the persons appearing in the plurality of contents, on the basis of the calculated depth-of-relationship value.

7. An image processing apparatus comprising:
a discrimination information memory unit in which pieces of discrimination information for use in discriminating faces of persons from one another are stored;
a manipulation recognition unit that recognizes a designating manipulation performed to designate one of the persons, who have the pieces of discrimination information thereon stored, as a specific person;
a contents input unit that inputs a plurality of contents;

a face detection unit that detects faces appearing in the inputted contents;

a face discrimination unit that discriminates the detected faces from one another on the basis of the pieces of discrimination information;

a depth-of-relationship value calculation unit that specifies persons, who appear in the plurality of contents, on the basis of the results of discrimination, and calculates a depth-of-relationship value, which indicate the degree of depth of the relationship between the specific person and a second person, on the basis of an appearance frequency of the second person or a third person other than the second person in contents in which the specific person appears, and on the basis of the appearance frequencies of the second person and the third person in contents in which the specific person does not appear, wherein the depth-of-relationship value calculation unit calculates scores to be given to pairs of persons, who appear in the plurality of contents, on the basis of the appearance frequencies of the pairs of persons, who appear together in the same contents, among the persons appearing in the plurality of contents, and wherein the depth-of-relationship value calculation unit calculates the depth-of-relationship value on the basis of: the score given to the pair of the specific person and the second person, the score given to the pair of the specific person and the third person, and the score given to the pair of the second person and the third person;

a priority determination unit that determines a priority, which is assigned to the second person relating to the specific person among the persons appearing in the plurality of contents, on the basis of the calculated depth-of-relationship value; and an output control unit that controls output of the inputted contents according to the determined priority.

8. An image processing method comprising the steps of:

regarding a person, who appears in any of a plurality of contents, as a specific person;

calculating a depth-of-relationship value, which indicate the degree of depth of the relationship between the specific person and a second person, on the basis of an appearance frequency of the second person or a third person other than the second person in contents in which the specific person appears, and on the basis of the appearance frequencies of the second person and the third person in contents in which the specific person does not appear;

calculating scores, which are given to pairs of persons appearing in the plurality of contents, on the basis of appearance frequencies of the pairs of persons, who appear together in the same contents, among the persons appearing in the plurality of contents, and the numbers of the persons who appear together in the same contents, wherein the depth-of-relationship value is calculated on the basis of: the score given to the pair of the specific person and the second person, the score given to the pair of the specific person and the third person, and the score given to the pair of the second person and the third person; and determining a priority, which is assigned to the second person relating to the specific person among the persons appearing in the plurality of contents, on the basis of the calculated depth-of-relationship value.

9. A program encoded on a non-transitory computer-readable medium that, when executed by a processor, causes a computer to execute the steps of:

regarding a person, who appears in any of a plurality of contents, as a specific person;

calculating a depth-of-relationship value, which indicates the degree of depth of the relationship between the specific person and a second person, on the basis of an appearance frequency of the second person or a third person other than the second person in contents in which the specific person appears, and on the basis of the appearance frequencies of the second person and the third person in contents in which the specific person does not appear, wherein the content includes a plurality of frames occupying a predetermined interval included in a motion picture;

calculating scores to be given to pairs of persons, who appear in the motion picture, on the basis of the appearance frequencies of the pairs of persons, who appear within the same intervals, among the persons appearing in the motion picture, and the periods during which the pairs of persons appear in the same frames within the same intervals, wherein the depth-of-relationship value is calculated on the basis of: the score given to the pair of the specific person and the second person, the score given to the pair of the specific person and the third person, and the score given to the pair of the second person and the third person; and determining a priority, which is assigned to the second person relating to the specific person among the persons appearing in the plurality of contents, on the basis of the calculated depth-of-relationship value.

* * * * *